United States Patent
Hirai et al.

(10) Patent No.: US 10,067,222 B2
(45) Date of Patent: Sep. 4, 2018

(54) LASER RANGEFINDER

(71) Applicants: FUNAI ELECTRIC CO., LTD., Osaka (JP); Kyoto University, Kyoto (JP)

(72) Inventors: Tomohisa Hirai, Osaka (JP); Ryusuke Horibe, Hirakata (JP); Manabu Murayama, Itami (JP); Shingo Setono, Ikoma (JP); Yuichiro Masuda, Takatsuki (JP); Atsushi Mushimoto, Daito (JP); Fumitoshi Matsuno, Kyoto (JP)

(73) Assignees: FUNAI ELECTRIC CO., LTD., Osaka (JP); KYOTO UNIVERSITY, Kyoto (JP)

( * ) Notice: Subject to any disclaimer, the term of this patent is extended or adjusted under 35 U.S.C. 154(b) by 492 days.

(21) Appl. No.: 14/814,810

(22) Filed: Jul. 31, 2015

(65) Prior Publication Data

US 2016/0033626 A1 Feb. 4, 2016

(30) Foreign Application Priority Data

Aug. 1, 2014 (JP) ................. 2014-158181
Aug. 4, 2014 (JP) ................. 2014-159023

(51) Int. Cl.
*G01C 3/08* (2006.01)
*G01S 7/481* (2006.01)
(Continued)

(52) U.S. Cl.
CPC ............ *G01S 7/481* (2013.01); *G01S 7/4817* (2013.01); *G01S 17/08* (2013.01); *G01S 17/42* (2013.01)

(58) Field of Classification Search
CPC ........ G01S 7/481; G01S 7/4817; G01S 17/08; G01S 17/42
See application file for complete search history.

(56) References Cited

U.S. PATENT DOCUMENTS

| | | |
|---|---|---|
| 5,033,845 A | 7/1991 | Sorimachi et al. |
| 5,095,383 A | 3/1992 | Omura et al. |

(Continued)

FOREIGN PATENT DOCUMENTS

| | | |
|---|---|---|
| JP | 62-87809 | 4/1987 |
| JP | 03-116112 | 5/1991 |

(Continued)

OTHER PUBLICATIONS

Koechner W. (2006) Laser Oscillator. In: Solid-State Laser Engineering. Springer Series in Optical Sciences, vol. 1. Springer, New York, NY. https://link.springer.com/chapter/10.1007/0-387-29338-8_4?no-access=true (Year: 2006).*

*Primary Examiner* — Samantha K Abraham
(74) *Attorney, Agent, or Firm* — Wenderoth, Lind & Ponack, L.L.P.

(57) ABSTRACT

A laser rangefinder includes a light source, a scanning mirror that scans laser light emitted from the light source by oscillating about an axis of oscillation J extending in a predetermined direction, a first lens that is disposed on an optical path of reflected light from a target object and condenses the reflected light onto the scanning mirror, a second lens that is disposed on an optical path of and condenses reflected light from the scanning mirror, and a photodetector that receives the reflected light condensed by the second lens. The first lens and the second lens are disposed in positions other than positions on an optical path of the laser light between a point of emission from the light source and a point of exit from the laser rangefinder.

17 Claims, 29 Drawing Sheets

(51) Int. Cl.
*G01S 17/08* (2006.01)
*G01S 17/42* (2006.01)

(56) References Cited

U.S. PATENT DOCUMENTS

| | | | |
|---|---|---|---|
| 5,680,648 A | 10/1997 | Nonaka | |
| 2002/0097505 A1* | 7/2002 | DeLong | G02B 17/086 |
| | | | 359/726 |
| 2006/0050263 A1* | 3/2006 | Mizuo | G01C 3/08 |
| | | | 356/5.01 |
| 2010/0282956 A1* | 11/2010 | Kimba | H01J 37/28 |
| | | | 250/252.1 |
| 2013/0214121 A1* | 8/2013 | Lee | G02B 27/40 |
| | | | 250/201.4 |

FOREIGN PATENT DOCUMENTS

| | | |
|---|---|---|
| JP | 10-274527 | 10/1998 |
| JP | 2001-304825 | 10/2001 |
| JP | 3463781 | 11/2003 |
| JP | 2004-126614 | 4/2004 |
| JP | 3639585 | 4/2005 |
| JP | 2006-317428 | 11/2006 |
| JP | 3984382 | 10/2007 |
| JP | 2009-63339 | 3/2009 |
| JP | 2012-68350 | 4/2012 |
| JP | 2013-117621 | 6/2013 |
| JP | 5208488 | 6/2013 |
| JP | 2013-210315 | 10/2013 |

* cited by examiner

LASER RANGEFINDER

CROSS REFERENCE TO RELATED APPLICATIONS

The present application is based on and claims priority of Japanese Patent Application No. 2014-158181 filed on Aug. 1, 2014 and Japanese Patent Application No. 2014-159023 filed on Aug. 4, 2014. The entire disclosures of the above-identified applications, including the specifications, drawings and claims are incorporated herein by reference in their entirety.

FIELD

The present invention relates to laser rangefinders that measure distance to a target object.

BACKGROUND

Examples of sensors used in automated robots to detect obstacles, or sensors used to detect people include laser rangefinders (LRF).

Laser rangefinders calculate the distance to a target object by measuring the time it takes emitted laser light to reach the target object and then return after reflecting off the target object. Laser rangefinders horizontally and vertically vary the direction in which laser light is emitted to measure distance to a target object, over an entire given area (hereinafter also referred to as "scanning area").

Such a laser rangefinder has been proposed that uses a motor to rotate a structure in which a light emission optical system for emitting light from the light source out of the laser rangefinder is integrated with a light reception optical system for receiving reflected light reflected from the target object (for example, see Patent Literature (PTL) 1). The laser rangefinder obtains distance information from the phase difference between the reflected light from the target object and the emitted light. The laser rangefinder further uses the motor to rotate a plate having a plurality of slits at predetermined intervals, and obtains rotation angle information using the pulse count detected by a photo interrupter disposed on the rotational path of the slit plate. This allows the laser rangefinder to calculate two-dimensional distance information.

CITATION LIST

Patent Literature

[PTL 1] Japanese Unexamined Patent Application Publication No. 2009-63339

SUMMARY

Technical Problem

When such a motor is used, however, the size of the motor depends on the weight of the optical systems to be rotated by the motor. This technique is problematic since it makes achieving a compact laser rangefinder difficult.

Another laser rangefinder has been proposed which uses a scanning mirror instead of a motor to adjust the emission direction of the laser light.

When such a scanning mirror is small and driven at high speeds, however, the scanning mirror only has an effective area of about 1 to 3 mm in diameter, thereby limiting the amount of light that can be projected onto the scanning mirror. The amount of light detectable by the photodetector is therefore small (i.e., the light detectable by the photodetector is faint). Thus, compared to when a motor is used, light from a distant target object strong enough to be used for measurement is difficult to obtain. In order to obtain light from a distant target object that is strong enough to be used for measurement, the effective area of the scanning mirror needs to be increased by, for example, roughly tens of millimeters in diameter, which makes achieving a compact laser rangefinder difficult.

The present invention has been conceived to solve the problems described above, and has a first object to provide a compact laser rangefinder capable of measuring distance to a distant target object.

There is also a need for the scanning area of the laser light, which is the area in which distance measurement is possible, to be even wider.

The present invention has been conceived to solve the problems described above, and has a second object to provide a compact laser rangefinder capable of measuring distance across a wide angle.

Solution to Problem

In order to achieve the above-described first object, the first laser rangefinder according to one aspect of the present invention measures a distance to a target object, and includes: a light source that emits laser light; an oscillating mirror that scans the laser light emitted from the light source by oscillating about an axis of oscillation extending in a predetermined direction; a first optical component that is disposed on an optical path of first reflected light and condenses the first reflected light onto the oscillating mirror, the first reflected light being the scanned laser light reflected from the target object; a second optical component that is disposed on an optical path of second reflected light and condenses the second reflected light, the second reflected light being the condensed first reflected light reflected from the oscillating mirror; and a photodetector that receives the second reflected light condensed by the second optical component. The first optical component and the second optical component are disposed in positions other than positions on an optical path of the laser light between a point of emission from the light source and a point of exit from the laser rangefinder.

With this, the first optical component and the second optical component for condensing the reflected light from the target object onto the photodetector inhibit generation of optical feedback of transmitted light that does not strike the target object or optical feedback of part of the reflected light, making it possible to measure the distance to a distant target object. Moreover, by scanning the laser light with the oscillating mirror, a compact laser rangefinder can be achieved. In other words, according to this aspect, a compact laser rangefinder capable of measuring distance to a distant target object can be achieved.

For example, the laser light emitted from the light source may exit the laser rangefinder without passing through a light-transmissive optical component.

With this, optical feedback of transmitted light that does not strike the target object or optical feedback of part of the reflected light can be more assuredly decreased.

Moreover, the first optical component and the second optical component may be disposed on opposite sides, in the predetermined direction, of an optical path of the laser light scanned by the oscillating mirror.

Moreover, the first optical component and the second optical component may be disposed in different positions in the predetermined direction, and the laser light may be scanned by the oscillating mirror, pass through a void formed between the first optical component and the second optical component, and then exit the laser rangefinder.

With this, an even more compact laser rangefinder can be achieved. In other words, achieving a configuration in which directions from the oscillating mirror toward each of the light source, the first optical component, and the second optical component can be made to appear approximately coincident when viewed in the predetermined direction yields a more compact laser rangefinder than when these directions do not overlap when viewed in the predetermined direction.

Moreover, the laser light may be emitted from the light source, pass through the void, and then reach the oscillating mirror.

Moreover, the second optical component may have an aperture, and the laser light may be emitted from the light source, pass through the aperture, and then reach the oscillating mirror.

With this, light on the first optical component side of the optical path of the laser light in the predetermined direction can be condensed. In other words, by condensing a wide area of light, the amount of reflected light guided to the photodetector can be increased. Thus, the distance to an even more distant target object can be measured.

Moreover, a direction from the oscillating mirror toward the first optical component and a direction from the oscillating mirror toward the second optical component may not overlap when viewed in the predetermined direction, the laser rangefinder may include a plurality of pairs of the first optical component and the second optical component, and a first pair and a second pair among the plurality of pairs may be symmetrically disposed about a normal to a reflective surface of the oscillating mirror, in the predetermined direction.

In this way, by disposing a plurality of identical optical systems so as to have symmetry, a greater degree of reflected light reflected from the target object can be received. Thus, the distance to an even more distant target object can be measured.

Moreover, for example, the second optical component may be a condensing lens that condenses the second reflected light by transmitting the second reflected light.

Moreover, for example, the second optical component may be a reflective mirror that condenses the second reflected light by reflecting the second reflected light.

Moreover, the second optical component may refract, with positive refractive power, in the predetermined direction, the second reflected light to produce collimated light, and the laser rangefinder may further include a third optical component that condenses the collimated light produced by the second optical component onto the photodetector.

With this, a band-pass filter (BPF) can be provided which allows light having a narrow band of wavelength including the wavelength of the laser light emitted from the light source to pass between the second optical component and the third optical component and inhibits all other light. Thus, with this aspect, adverse effects arising from ambient light can be inhibited and a high accuracy of distance measurement can be maintained. Here, when the BPF is a multilayer dielectric structure, transmittance is dependent on the angle of incidence. Thus, as a result of the second optical component producing collimated light, even when a multilayer dielectric structure is used as the BPF, transmittance can be made even, and adverse effects arising from ambient light can be inhibited and a high accuracy of distance measurement can be maintained.

Moreover, for example, the first optical component may be a toroidal lens having a condensing function only in the predetermined direction among the predetermined direction and a direction perpendicular to the predetermined direction.

Moreover, in order to achieve the above-described second object, the second laser rangefinder according to one aspect of the present invention further includes a fourth optical component that is disposed on an optical path of the laser light scanned by the oscillating mirror and has a thickness that increases with proximity to an end of a scanning area of the laser light scanned by the oscillating mirror, the thickness being measured along an optical path in a plane perpendicular to the predetermined direction. The first optical component condenses, in a direction parallel to the predetermined direction, the laser light scanned through the fourth optical component and subsequently reflected by the target object, and has a thickness that varies in accordance with the fourth optical component, the thickness being measured along an optical path in a plane perpendicular to the predetermined direction. The first optical component is integrally formed with the fourth optical component.

With this, the first optical component and the fourth optical component have negative power in a surface perpendicular to the axis of oscillation of the oscillating mirror. This makes it possible to emit laser light having a wider angle than the scan angle of the laser light scanned by the oscillating mirror—that is to say, the oscillating angle of the oscillating mirror. Moreover, the reflected light of the emitted laser light having a wider angle than the oscillating angle of the oscillating mirror can be condensed in a direction parallel to the axis of oscillation, and distance can be measured. In other words, with this aspect, provision of the oscillating mirror allows for a compact laser rangefinder to be achieved and distance measurement to be performed across a wide angle.

For example, a normal to a surface of the fourth optical component on which the laser light is incident may be oblique to an optical path of the incident laser light.

With this, the concern that optical feedback from the surface of incidence will reflect off the oscillating mirror and be guided to the photodetector can be inhibited, and thus incorrect measurement can be inhibited.

Moreover, in a plane including the axis of oscillation, a surface of the first optical component from which the laser light reflected from the target object exits may be a concave surface.

With this, refractive power in a direction parallel to the axis of oscillation can be adjusted accordingly.

Moreover, in a plane including the axis of oscillation, the concave surface may have a curvature that increases with proximity to an end of the scanning area of the laser light scanned by the oscillating mirror.

With this, a difference in the refractive power in a direction parallel to the axis of oscillation can be cancelled out to achieve a more uniform direction. With this, the first optical component can effectively condense the reflected light onto the oscillating mirror. In other words, according to this aspect, distance to an even more distant target object can be measured.

Moreover, the first optical component and the fourth optical component may be disposed on an opposite side, in the predetermined direction, of an optical path of the laser light between the light source and the oscillating mirror, relative to the second optical component.

Moreover, the first optical component, the second optical component, and the fourth optical component may be disposed in different positions in the predetermined direction, and the laser light may reach the oscillating mirror from the light source after passing through a void formed between (i) the first optical component and the fourth optical component and (ii) the second optical component.

With this, an even more compact laser rangefinder can be achieved. In other words, achieving a configuration in which directions from the oscillating mirror toward each of the light source, the first optical component, the second optical component, and the fourth optical component can be made to appear approximately coincident when viewed in the predetermined direction yields a more compact laser rangefinder than when these directions do not overlap when viewed in the predetermined direction. Moreover, since this makes it possible to achieve a wide angle of oscillation of the oscillating mirror, distance measurement across an even wider angle is possible.

Advantageous Effects

With the first laser rangefinder according to one aspect of the present invention, a compact laser rangefinder capable of measuring distance to a distant target object can be achieved.

With the second laser rangefinder according to one aspect of the present invention, a compact laser rangefinder capable of measuring distance across a wide angle.

BRIEF DESCRIPTION OF DRAWINGS

These and other objects, advantages and features of the invention will become apparent from the following description thereof taken in conjunction with the accompanying drawings that illustrate a specific embodiment of the present invention.

DESCRIPTION OF EMBODIMENTS

Hereinafter, embodiments are described in greater detail with reference to the accompanying Drawings. Each of the following embodiments describes a general or specific example. The numerical values, shapes, materials, structural components, the arrangement and connection of the structural components etc. shown in the following embodiments are mere examples, and therefore do not limit the present invention. Among the structural components in the following exemplary embodiments, structural components not recited in any one of the independent claims are described as arbitrary structural components. Note that the Drawings are schematic drawings, and may not depict exact dimensions or dimensional ratios.

Embodiment 1

Here, the laser rangefinder according to Embodiment 1 will be described with reference to FIG. 1 through FIG. 6.

1. Overall Configuration of the Laser Rangefinder

First, the configuration of the laser rangefinder according to Embodiment 1 will be described with reference to FIG. 1.

Figure 1:
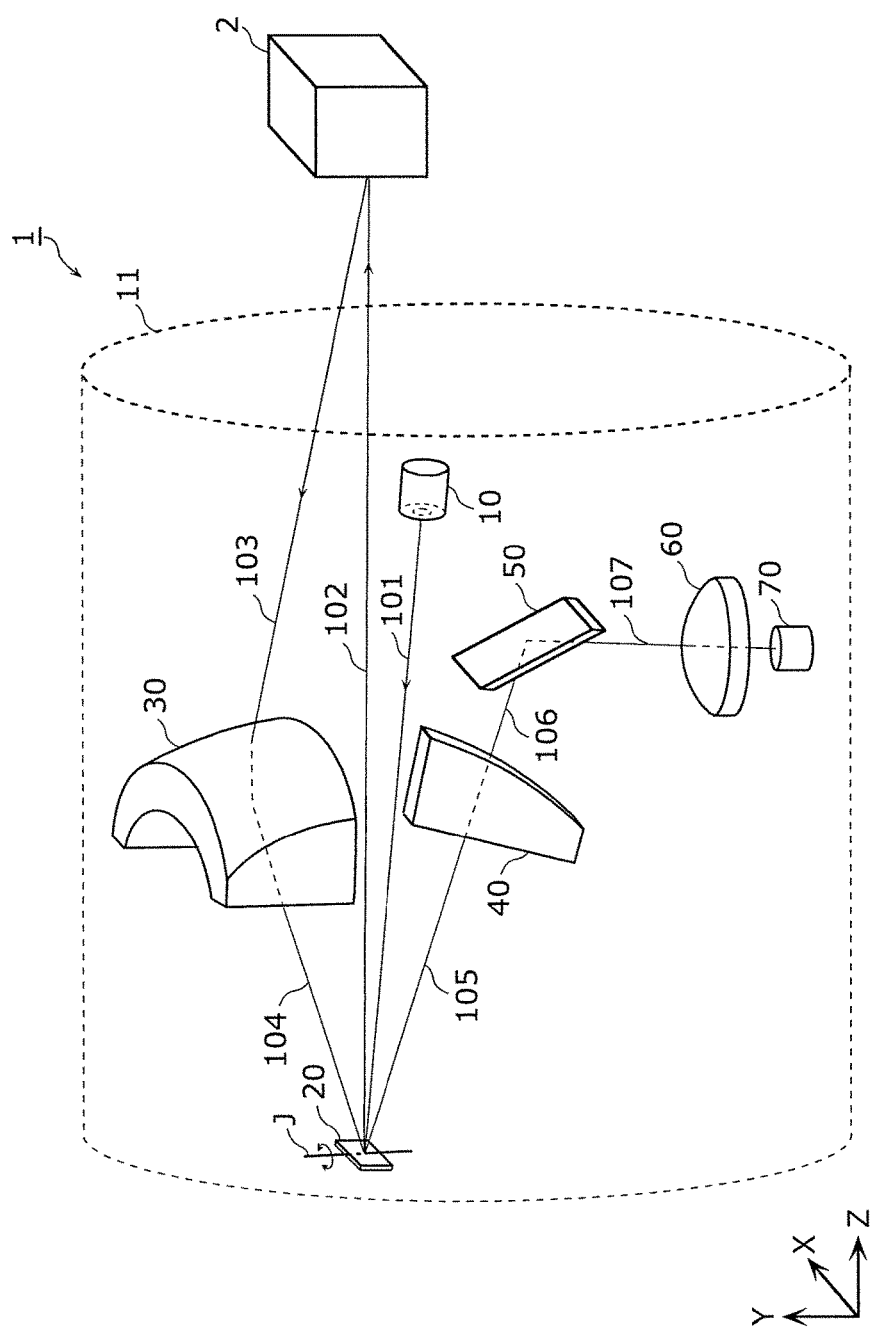
FIG. 1 is a schematic perspective view of one example of a configuration of a laser rangefinder according to Embodiment 1.

FIG. 1 is a schematic perspective view of one example of the configuration of the laser rangefinder 1 according to Embodiment 1. Note that FIG. 1 also illustrates the target object 2 to which distance from the laser rangefinder 1 is measured by the laser rangefinder 1. FIG. 1 also illustrates the enclosure 11 of the laser rangefinder 1 as transparent so as to show the internals of the enclosure 11. In FIG. 1, the Z axis is illustrated as being parallel to the scanning axis (reference direction) of the laser rangefinder 1, and the Y axis is illustrated as being parallel to the vertical directions (directions in which gravity works in an installed state). Hereinafter, the Y axis directions will be referenced as the vertical directions. However, depending on usage, it is conceivable that the Y axis directions may extend in directions other than the vertical directions. Therefore, the Y axis directions are not limited to extending in the vertical directions. The same applies to the Drawings referenced in the subsequent descriptions as well.

Moreover, hereinafter, the "positive direction of the X axis" refers to the direction in which the arrow of the X axis in the Drawings is pointing, and the "negative direction of the X axis" is the direction opposite the positive direction, for example. The same applies to the Y and Z axis directions.

As illustrated in FIG. 1, the laser rangefinder 1 according to Embodiment 1 includes, inside the enclosure 11, a light source 10, a scanning mirror 20, a first lens 30, a second lens 40, a fixed mirror 50, a third lens 60, and a photodetector 70. Although not depicted in the Drawings, the laser rangefinder 1 further includes a signal processor that calculates the distance to the target object 2 using the phase difference between the laser light emitted from the light source 10 and the light received by the photodetector 70.

The light source 10 emits laser light 101, and is, for example, a laser diode (LD). More specifically, the light source 10 emits the laser light 101 toward the scanning mirror 20 and is disposed such that the optical axis of the emitted laser light 101 is oblique to a plane perpendicular to the axis of oscillation J of the scanning mirror 20. The light source 10 further includes a collimating lens that converts diffused light emitted by the LD into collimated light. In other words, the laser light 101 emitted by the light source 10 is collimated light.

As illustrated in FIG. 1, the scanning mirror 20, which is one example of the oscillating mirror, scans the laser light 101 from the light source 10 by oscillating about the axis of oscillation J, which extends in a predetermined direction (in Embodiment 1, the predetermined direction is a vertical direction). In other words, the scanning mirror 20 reflects the laser light 101 from the light source 10 as laser light 102, which is used by the laser rangefinder 1 for scanning purposes. With this, the laser light 102 is scanned across the scanning area. The scanning mirror 20 is, for example, a MEMS mirror including a minuscule mechanical mirror component disposed on a silicon substrate having an electronic circuit thereon.

The first lens 30, which is one example of the first optical component, is disposed on the optical path of first reflected light, which is the scanned laser light 102 reflected from the target object 2 (in Embodiment 1, the reflected light 103), and condenses the first reflected light (reflected light 103) onto the scanning mirror 20. The first lens 30 is disposed in a position other than a position on the optical path of laser light 101 between the point of emission from the light source 10 and the point of exit from the laser rangefinder 1 (i.e., point of exit from the enclosure 11). The first lens 30 will be described in further detail later.

The second lens 40, which is one example of the second optical component, is disposed on the optical path of second reflected light (in Embodiment 1, reflected light 105) and condenses the second reflected light (reflected light 105). The second reflected light refers to the condensed first reflected light (in Embodiment 1, reflected light 104) reflected from the scanning mirror 20. Similar to the first lens 30, the second lens 40 is disposed in a position other than a position on the optical path of laser light 101 between the point of emission from the light source 10 and the point of exit from the laser rangefinder 1. The second lens 40 will be described in further detail later.

Here, to "condense" light refers to the refracting or reflecting of light by an optical component having positive optical power. In other words, an optical component having light condensing properties is an optical component having positive optical power. More specifically, in contrast to the first lens 30, which condenses the collimated or diffused reflected light 103 from the target object 2 onto the scanning mirror 20 as reflected light 104, the second lens 40 condenses the diffused reflected light 105 from the scanning mirror 20 to produce collimated light 106.

The fixed mirror 50 is a substantially planar mirror disposed on the optical path of the collimated light 106, and reflects the collimated light 106 to produce collimated light 107.

The third lens 60, which is one example of the third optical component, condenses the collimated light 106 from the second lens 40 onto the photodetector 70. More specifically, the third lens 60 is disposed on the optical path of the collimated light 107 and condenses the collimated light 106 onto the photodetector 70 by condensing the collimated light 107 produced by the fixed mirror 50 onto the photodetector 70. The third lens 60 will be described in further detail later.

The photodetector 70 is, for example, a photodiode (PD) or an avalanche photodiode (APD), which is more sensitive than the photodiode, which receives the condensed reflected light 105 from the second lens 40. More specifically, the photodetector 70 receives, via the fixed mirror 50 and the third lens 60, the collimated light 106, which is the condensed reflected light 105 from the second lens 40.

The signal processor (not shown in the Drawings) calculates the distance from the laser rangefinder 1 to the target object 2 using a phase difference between a modulated signal included in the laser light emitted from the light source 10 and the light received by the photodetector 70. In other words, the signal processor uses this phase difference to calculate the time it takes the laser light to reach the photodetector 70 after being emitted from the light source 10. This elapse of time is the time it takes the laser light to travel round-trip from the light source 10 to the measurement target object and back. Thus, the signal processor can calculate the distance by multiplying half the calculated time by the speed of light.

The configuration of the laser rangefinder 1 according to Embodiment 1 has hereinbefore been described.

Here, the laser light 101 and the laser light 102 are linearly-polarized light, the strength of which is relatively strong. In contrast, as a result of the laser light 102 being reflected and scattered by the target object 2, the reflected light 103 from the target object 2 is very faint scattered light.

As such, in Embodiment 1, the reflected light 103, which is scattered light, is condensed by the first lens 30 onto the scanning mirror 20 as reflected light 104. Moreover, the light produced by the scanning mirror 20 as a result of the scanning mirror 20 reflecting the reflected light 104—that is to say, the diffused reflected light 105 from the scanning mirror 20—is condensed by the second lens 40 and guided to the photodetector 70. With this, a sufficient amount of light for detection can be secured by the photodetector 70 with Embodiment 1.

Furthermore, in Embodiment 1, by disposing the first lens 30 and the second lens 40 in positions other than positions on the optical path of the laser light 101 between the point of emission from the light source 10 and the point of exit from the laser rangefinder 1 (hereinafter, this optical path is also referred to as the "optical path of emitted light"), a sufficient amount of light for detection can be absolutely secured by the photodetector 70. In other words, distance measurement can be performed even when the reflected light 103 from the target object 2 is very weak due to the target object 2 being distant from the laser rangefinder 1.

More specifically, when disposed on the optical path of emitted light, the first lens 30 and the second lens 40 may reflect part of the laser light 101 emitted from the light source 10. In other words, generation of optical feedback from the first lens 30 and the second lens 40 of transmitted light that does not strike the target object 2 or part of the reflected light may cause the laser light 102 exiting the laser rangefinder to be weaker than the laser light 101 emitted from the light source 10. This also weakens the reflected light 103 reflected from the target object 2, creating cause for concern that distance measurement may not be possible when the target object 2 is distant from the laser rangefinder 1.

In contrast, with Embodiment 1, since the first lens 30 and the second lens 40 are located in positions other than positions on the optical path of emitted light, optical feedback can be inhibited, and distance to a distant target object 2 can be measured.

2. Optical System

Next, the optical paths and configurations of the optical system components in the laser rangefinder 1 according to Embodiment 1 described above will be described with reference to FIG. 2 through FIG. 6. Note that, hereinafter, among optical system components of the laser rangefinder 1, the configuration of the first lens 30, the second lens 40, and the third lens 60 will be described in detail, but descriptions other optical system components are omitted.

2-1. Optical Path of Light Reception

Figure 2:
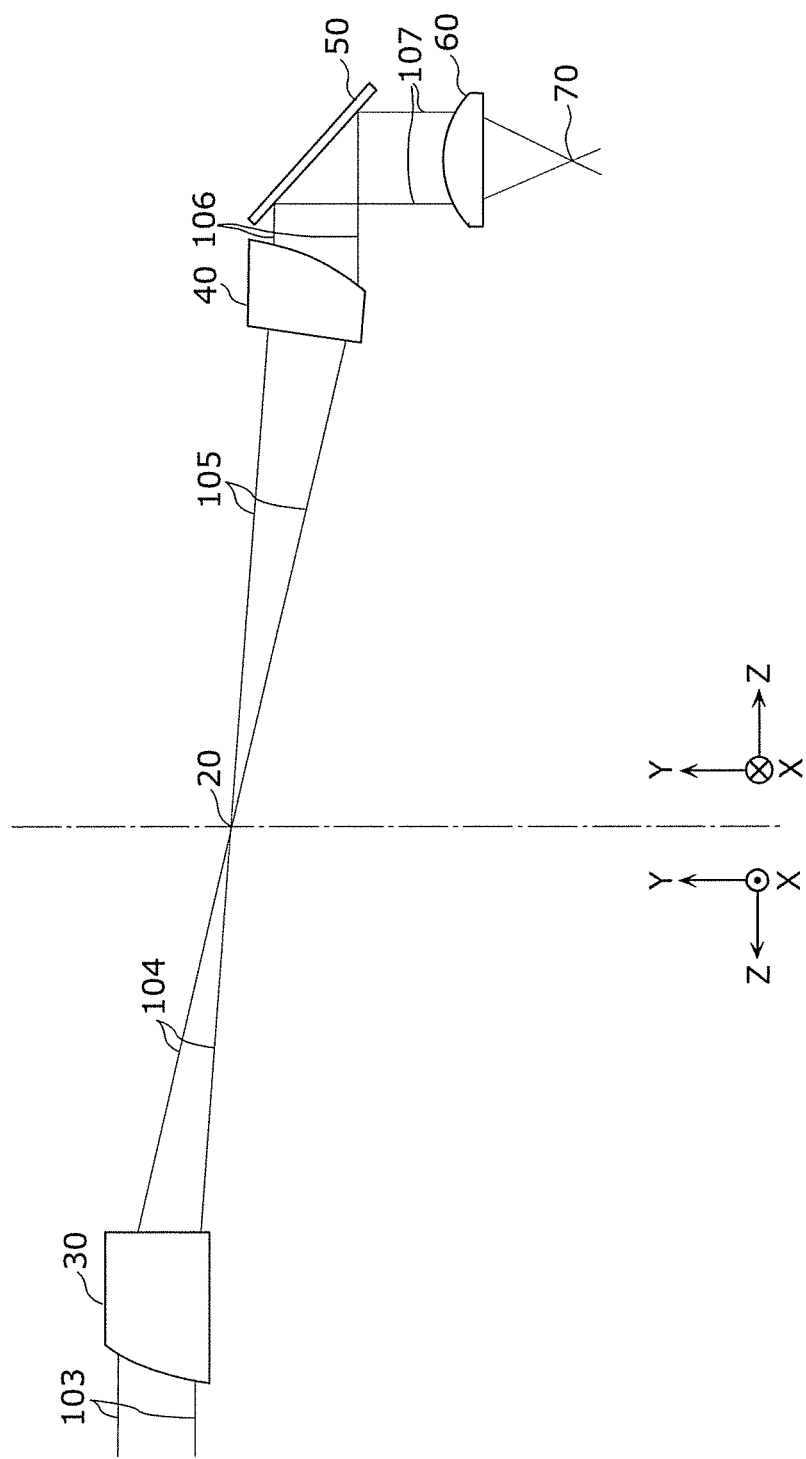
FIG. 2 illustrates optical paths of light reception of reflected light reflected from a target object in a laser rangefinder according to Embodiment 1.

First, the optical path of light reception of the reflected light 103 reflected from the target object 2 in the laser rangefinder 1 according to Embodiment 1 will be described with reference to FIG. 2. FIG. 2 illustrates optical paths of light reception of the reflected light 103 reflected from the target object 2 in the laser rangefinder 1 according to Embodiment 1. Note that for illustrative purposes, in FIG. 2, the optical path of reflected light up to being incident on the scanning mirror 20 (i.e., the reflected light 103 and the reflected light 104) and the optical path of reflected light after being reflected by the scanning mirror 20 (i.e., the reflected light 105, the collimated light 106, and the collimated light 107) are shown as being reflected about the scanning mirror 20 in the center.

As illustrated in FIG. 2, the reflected light 103 reflected from the target object 2 is condensed onto the scanning mirror 20 as reflected light 104 by the first lens 30. The reflected light 104 incident on the scanning mirror 20 is reflected by the scanning mirror 20 as reflected light 105 (diffused light). The reflected light 150 is then incident on the second lens 40. The second lens 40 condenses the reflected light 105 and produces collimated light 106. The collimated light 106 is then incident on the fixed mirror 50 whereby collimated light 107 is reflected toward the third lens 60. The collimated light 107 is then condensed by the third lens 60 onto the photodetector 70.

In order to achieve this optical path of light reception, each lens (the first lens 30, the second lens 40, and the third lens 60) is required to have the following functions.

Within the scan angle of the scanning mirror 20, the first lens 30 is required to have positive power in a direction parallel to the axis of oscillation J of the scanning mirror 20 (in Embodiment 1, in a vertical direction). The second lens 40 is required to have positive power in a direction parallel to the axis of oscillation J. The third lens 60 is required to have positive power.

Each lens configured to achieve these functions preferably has the following cross sectional shape in a plane parallel to the vertical direction: the first lens 30 preferably has a convex surface of incidence (surface on which reflected light 103 is incident) and a planar surface of emission (surface through which reflected light 104 exits), the second lens 40 preferably has a planar surface of incidence (surface on which reflected light 105 is incident) and a convex surface of emission (surface through which collimated light 106 exits), and the third lens 60 preferably has a convex surface of incidence (surface on which collimated light 107 is incident) and a planar or convex surface of emission. Note that, hereinafter, the shapes of the lens surfaces will be described in this manner, but these surface shapes are just one example for favorably correcting aberration with a relatively low number of lenses (for example, three lenses); the surfaces may have any shape that allows for a configuration which can achieve a power arrangement having the above-described functions.

2-2. Arrangement

Figure 3:
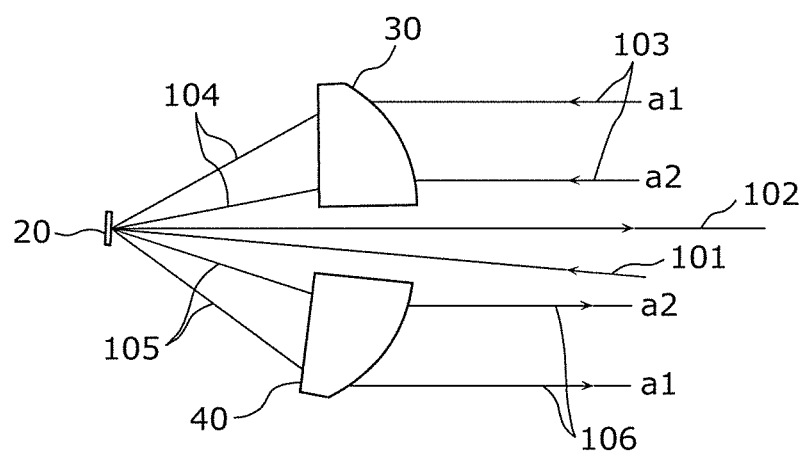
FIG. 3 illustrates YZ plane optical paths in a laser rangefinder according to Embodiment 1.
Figure 3:
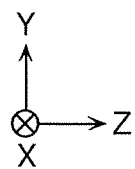

Next, the arrangement of the first lens 30 and the second lens 40 having the above-described functions will be described with reference to FIG. 3. FIG. 3 illustrates YZ plane optical paths in the laser rangefinder 1 according to Embodiment 1.

As illustrated in FIG. 3, the first lens 30 and the second lens 40 are disposed in positions other than positions on the optical path of laser light 101 between the point of emission from the light source 10 and the point of exit from the laser rangefinder 1. In other words, the laser light 101 emitted from the light source 10 exits the laser rangefinder 1 without passing through a light-transmissive optical component.

More specifically, as illustrated in FIG. 1 and FIG. 3, the first lens 30 and the second lens 40 are disposed in different positions in a vertical direction. Here, the laser light 101 from the light source 10 and the laser light 102 from the scanning mirror 20 pass through a void formed between the first lens 30 and the second lens 40 and exit the laser rangefinder 1.

Here, as illustrated in FIG. 3, among optical paths a1 and a2 of the reflected light 103, optical path a1 is in a higher position (further in the positive direction of the Y axis) than optical path a2 up to the scanning mirror 20, but after the light is reflected by the scanning mirror 20, optical path a1 is in a lower position than optical path a2.

2-3. Structure

Next, the structure of each lens (the first lens 30, the second lens 40, and the third lens 60) will be described.

2-3-1. First Lens

Figure 4A:
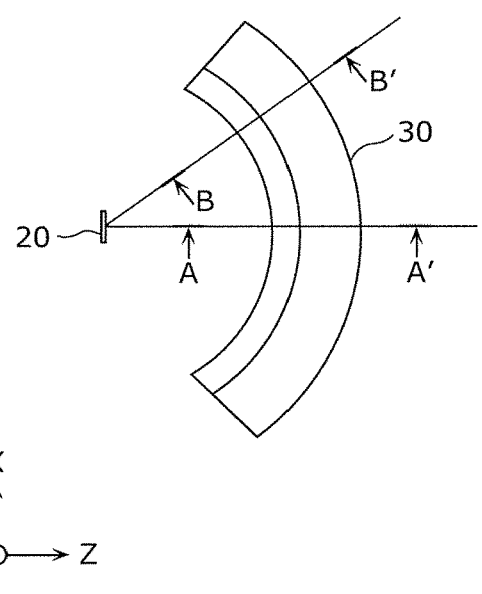
FIG. 4A is a top view of a structure of a first lens according to Embodiment 1.
Figure 4B:
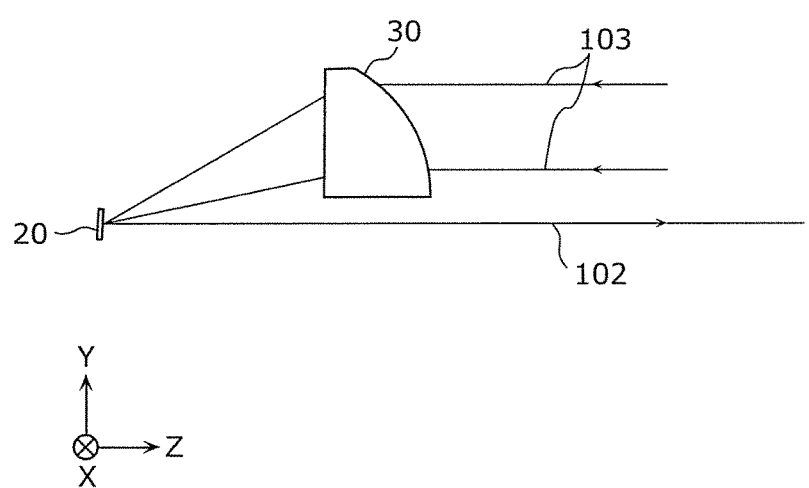
FIG. 4B illustrates optical paths of light passing through the first lens in a cross section taken at line A-A' and B-B' in FIG. 4A.

First, the structure of the first lens 30 will be described with reference to FIG. 4A and FIG. 4B. FIG. 4A is a top view of the structure of the first lens 30 according to Embodiment 1. More specifically, FIG. 4A is a top view of the first lens 30 from the positive side of the Y axis. FIG. 4B illustrates optical paths of light passing through the first lens 30 in a cross section taken at line A-A' and B-B' in FIG. 4A. Note that for illustrative purposes, FIG. 4A and FIG. 4B also show the scanning mirror 20.

As illustrated in FIG. 4A, the first lens 30 does not have light condensing properties in horizontal directions (in directions parallel to the XZ plane). More specifically, the first lens 30 has a substantially even horizontal thickness.

Moreover, as illustrated in FIG. 4B, the first lens 30 has light condensing properties in vertical directions, and condenses the incident reflected light 103 onto a central region of the scanning mirror 20. Here, the cross sectional shape of the first lens 30 taken at line A-A' in FIG. 4A is substantially identical to the cross sectional shape of the first lens 30 taken at line B-B' in FIG. 4A. Note that the cross sectional shape of the first lens 30 in planes other than the cross section taken at A-A' in FIG. 4A and the cross section taken at B-B' in FIG. 4A is also substantially identical to that illustrated in FIG. 4B.

The first lens 30 is disposed above the optical path of the laser light 102 (further in the positive direction of the Y axis), and a void formed between the first lens 30 and the second lens 40 is disposed on the optical axis of the first lens 30.

For example, a toroidal lens having light condensing properties only in vertical directions among vertical and horizontal directions (here, horizontal directions are directions parallel in the XZ plane) may be used as the first lens 30. More specifically, such a toroidal lens has a toroidal surface, which is a curved surface resulting when a circle rotates around an axis that does not pass through the center of the circle, and has cross sections in the XZ plane and the YZ plane that have different curvatures.

2-3-2. Second Lens

Figure 5:
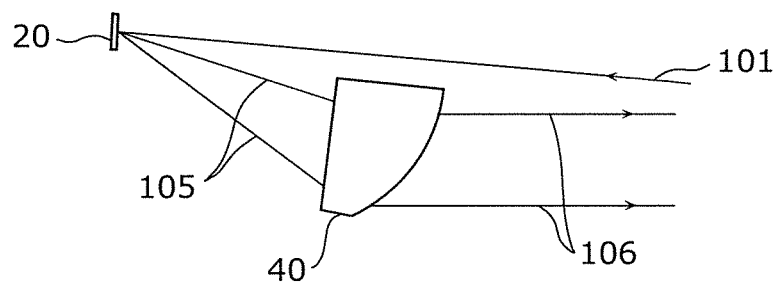
FIG. 5 illustrates YZ plane optical paths of light passing through a second lens according to Embodiment 1.

Next, the structure of the second lens 40 will be described with reference to FIG. 5. FIG. 5 illustrates YZ plane optical paths of light passing through the second lens 40 according to Embodiment 1. Note that for illustrative purposes, FIG. 5 also shows the scanning mirror 20.

As illustrated in FIG. 5, the second lens 40 has light condensing properties in vertical directions, and produces the collimated light 106 by condensing incident reflected light 105, which exhibits divergence, from the scanning mirror 20.

The second lens 40 is disposed below the optical path of the laser light 101 (further in the negative direction of the Y axis), and a void formed between the first lens 30 and the second lens 40 is disposed on the optical axis of the second lens 40.

For example, a cylindrical lens having light condensing properties in vertical directions may be used as the second lens 40. More specifically, a cylindrical lens has a shape of a piece cut from a cylinder having a rotational axis parallel to the X axis, at a plane parallel to the X axis.

The collimated light 106 exiting such a second lens 40 reflects off the fixed mirror 50 as collimated light 107 having a different optical axis than the reflected light 105, and is subsequently incident on the third lens 60.

2-3-3. Third Lens

Figure 6:
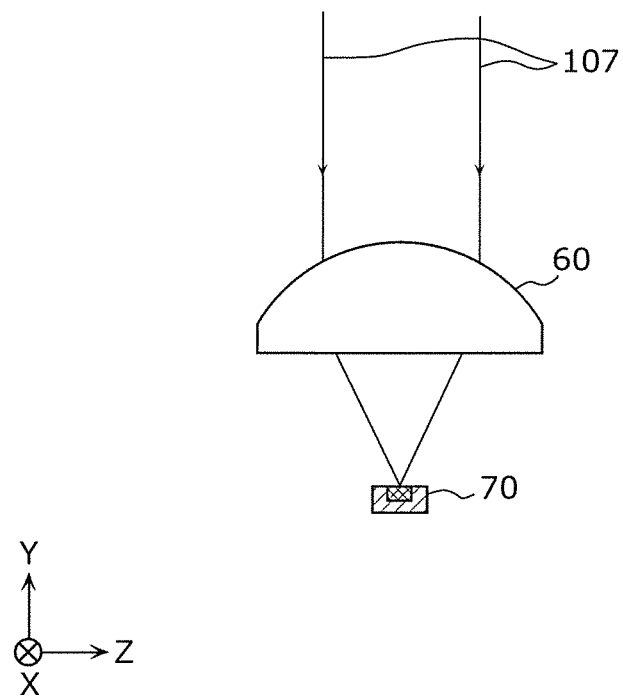
FIG. 6 illustrates YZ plane optical paths of light passing through a third lens according to Embodiment 1.

Next, the structure of the third lens 60 will be described with reference to FIG. 6. FIG. 6 illustrates YZ plane optical paths of light passing through the third lens 60 according to Embodiment 1. Note that for illustrative purposes, FIG. 6 also shows the photodetector 70.

The third lens 60 has light condensing properties in both the X and Z axis directions, and condenses collimated light 107 incident from the fixed mirror 50 onto a central region of the light receiving surface of the photodetector 70. Note that FIG. 6 illustrates a cross section of the third lens 60 in the YZ plane, but a cross section of the third lens 60 in the XY plane is substantially identical to the cross section illustrated in FIG. 6.

For example, a typical convex lens having symmetry about its optical axis may be used as the third lens 60.

3. Advantageous Effect

As described above, in Embodiment 1, the laser rangefinder 1 includes a scanning mirror 20 that scans the laser light 101 from the light source 10, and the first lens 30 and the second lens 40 are disposed in positions other than positions on the optical path of emitted light.

This configuration of the first lens 30 and the second lens 40 for condensing the reflected light 103 from the target object 2 onto the photodetector 70 inhibits generation of optical feedback of transmitted light that does not strike the target object 2 or optical feedback of part of the reflected light, making it possible to measure the distance to a distant target object 2. Moreover, by scanning the laser light 102 with the scanning mirror 20, a compact laser rangefinder 1 can be achieved. In other words, with the laser rangefinder 1 according to Embodiment 1, a compact laser rangefinder capable of measuring distance to a distant target object 2 can be achieved.

More specifically, the first lens 30 is disposed to one side of a plane through which both the laser light 101 from the light source 10 and the laser light 102, which is the reflected laser light 101, pass. Moreover, the reflected light 103 reflected from the target object 2 is transformed into the reflected light 104 by the first lens 30, and the reflected light 104 has a focal point on the surface of the scanning mirror 20.

Here, from the perspective of maintaining the compactness of the scanning mirror 20, the focal point of the reflected light 104 on the scanning mirror 20 is preferably in the vicinity of the position where the laser light 101 is incident and reflected on the scanning mirror 20, and further preferably substantially in the same position.

With this in mind, in Embodiment 1, since the first lens 30 disposed to one side of the plane described above is inclined at a predetermined angle relative to the reflected light 103 (the optical axis of the reflected light 103) condenses the reflected light 103 to produce condensed reflected light 104, the focal point of the reflected light 104 and the point of reflection of the laser light 101 can be brought closer together. This makes it possible to achieve a more compact scanning mirror 20. More specifically, by configuring the first lens 30 such that the focal point of the reflected light 104 and the point of reflection of the laser light 101 on the scanning mirror 20 are at the same point, an extremely compact scanning mirror 20 can be realized.

Moreover, by disposing the first lens 30 to condense the reflected light 104 at a predetermined angle oblique to the reflected light 103, the reflected light 105 travels to the other side of the above described plane. With this, according to Embodiment 1, the optical axis of the light reaching the photodetector 70 can be separated from the optical axis 103 of light to the light source 10. Thus, since the light source 10 and the photodetector 70 can be disposed in different spaces, the light projection system related to the light source 10 and the light reception system related to the photodetector 70 can be kept from interfering with one another.

Moreover, with Embodiment 1, the laser light 101 emitted from the light source 10 exits the laser rangefinder 1 without passing through a light-transmissive optical component.

With this, generation of optical feedback of the laser light 101 emitted from the light source 10 can be inhibited to a greater degree. Moreover, according to Embodiment 1, the first lens 30 and the second lens 40 are disposed on opposite sides, in a vertical direction, of the optical path of the laser light 102 from the scanning mirror 20. More specifically, the first lens 30 and the second lens 40 the laser light 101 are disposed in different positions in the predetermined direction, and the laser light 102 from the scanning mirror 20 passes through a void formed between the first lens 30 and the second lens 40 and then exits the laser rangefinder 1.

With this, a more compact laser rangefinder 1 can be achieved. In other words, achieving a configuration in which directions from the scanning mirror 20 toward each of the light source 10, the first lens 30, and the second lens 40 can be made to appear approximately coincident when viewed in a vertical direction (i.e., in the positive direction of the Y axis) yields a more compact laser rangefinder 1 than when these directions do not overlap when viewed in the vertical direction.

Moreover, in Embodiment 1, the second lens 40 is a positive lens that refracts the reflected light 105 to produce collimated light, and the laser rangefinder 1 further includes a third lens 60 that condenses the collimated light produced by the second lens 40 onto the photodetector 70.

With this, a BPF can be provided which allows light having a narrow band of wavelength including the wavelength of the laser light 101 emitted from the light source 10 to pass between the second lens 40 and the third lens 60 and inhibits all other light. Thus, the laser rangefinder 1 according to Embodiment 1 can inhibit adverse effects arising from ambient light and maintain a high accuracy of distance measurement. Here, when the BPF is a multilayer dielectric structure, transmittance is dependent on the angle of incidence. Thus, as a result of the second lens 40 producing collimated light, even when a multilayer dielectric structure is used as the BPF, transmittance can be made even, and adverse effects arising from ambient light can be inhibited and a high accuracy of distance measurement can be maintained.

Variation 1 of Embodiment 1

Here, the laser rangefinder according to Variation 1 of Embodiment 1 will be described with reference to FIG. 7 and FIG. 8.

Figure 7:
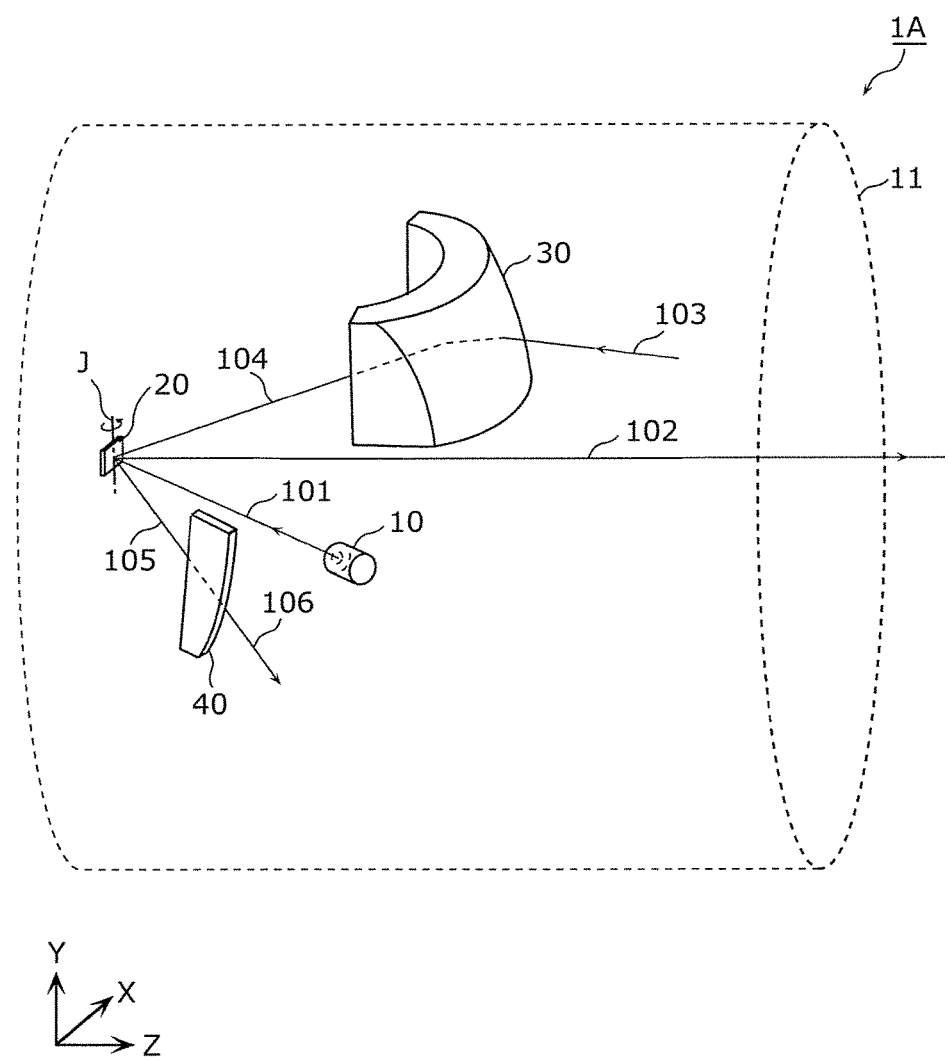
FIG. 7 is a schematic perspective view of one example of a configuration of a laser rangefinder according to Variation 1 of Embodiment 1.

FIG. 7 is a schematic perspective view of one example of the configuration of the laser rangefinder 1A according to Variation 1 of Embodiment 1. Note that FIG. 7 also illustrates the enclosure 11 of the laser rangefinder 1A as transparent so as to show the internals of the enclosure 11. In FIG. 7, illustrations of the fixed mirror 50, the third lens 60, and the photodetector 70 are omitted. FIG. 8 is a top view illustrating the arrangement of the scanning mirror 20, the first lens 30, and the second lens 40 according to Variation 1 of Embodiment 1. More specifically, FIG. 8 illustrates the arrangement of the scanning mirror 20, the first lens 30, and the second lens 40 when viewed in a vertical direction (the positive direction of the Y axis).

The laser rangefinder 1A according to Variation 1 of Embodiment 1 is substantially similar to the laser rangefinder 1 according to Embodiment 1, but differs in the following points.

In Embodiment 1, the direction from the scanning mirror 20 toward the first lens 30 and the direction from the scanning mirror 20 toward the second lens 40 appear essentially coincident when viewed in a vertical direction (i.e., in the positive direction of the Y axis). In other words, in Embodiment 1, the optical axes of the first lens 30 and the second lens 40 appear essentially coincident when viewed in a vertical direction (i.e., in the positive direction of the Y axis).

Figure 8:
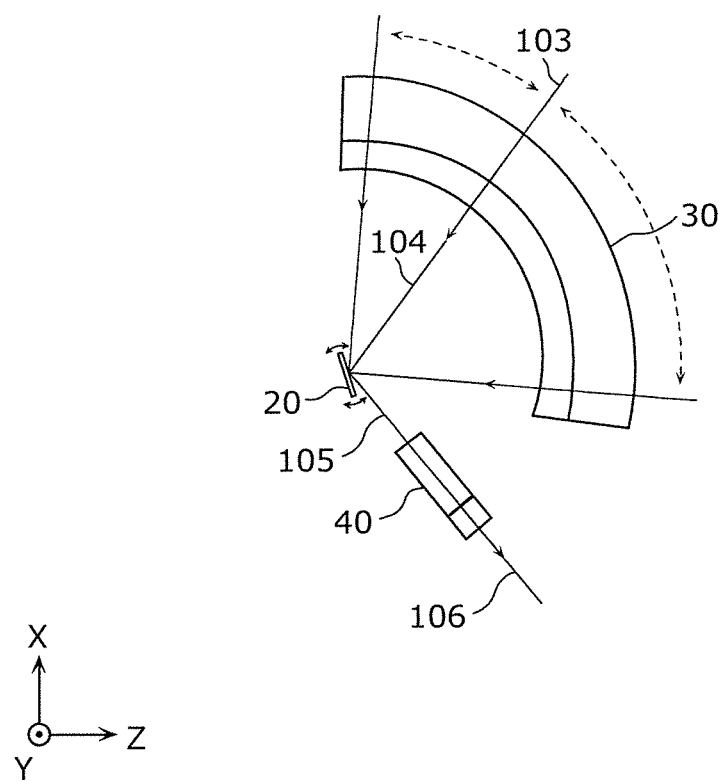
FIG. 8 is a top view illustrating an arrangement of a scanning mirror, a first lens, and a second lens according to Variation 1 of Embodiment 1.

In contrast, as illustrated in FIG. 7 and FIG. 8, in Variation 1 of Embodiment 1, the direction from the scanning mirror 20 toward the first lens 30 and the direction from the scanning mirror 20 toward the second lens 40 do not overlap when viewed in a vertical direction (i.e., in the positive direction of the Y axis). In other words, in Variation 1 of Embodiment 1, the optical axes of the first lens 30 and the second lens 40 do not overlap when viewed in a vertical direction.

Similar to Embodiment 1, since, in the laser rangefinder 1A according to Variation 1 of Embodiment 1 configured as described above, the first lens 30 and the second lens 40 are disposed in positions other than positions on the optical path of laser light 101 between the point of emission from the light source 10 and the point of exit from the laser rangefinder 1A, the laser rangefinder 1A according to Variation 1 of Embodiment 1 achieves the same advantageous effects as Embodiment 1.

Moreover, since the direction from the scanning mirror 20 toward the first lens 30 and the direction from the scanning mirror 20 toward the second lens 40 do not overlap when viewed in a vertical direction (i.e., in the positive direction of the Y axis), arrangement of the first lens 30 and the second lens 40 is more flexible.

Variation 2 of Embodiment 1

Here, the laser rangefinder according to Variation 2 of Embodiment 1 will be described with reference to FIG. 9 and FIG. 10.

Figure 9:
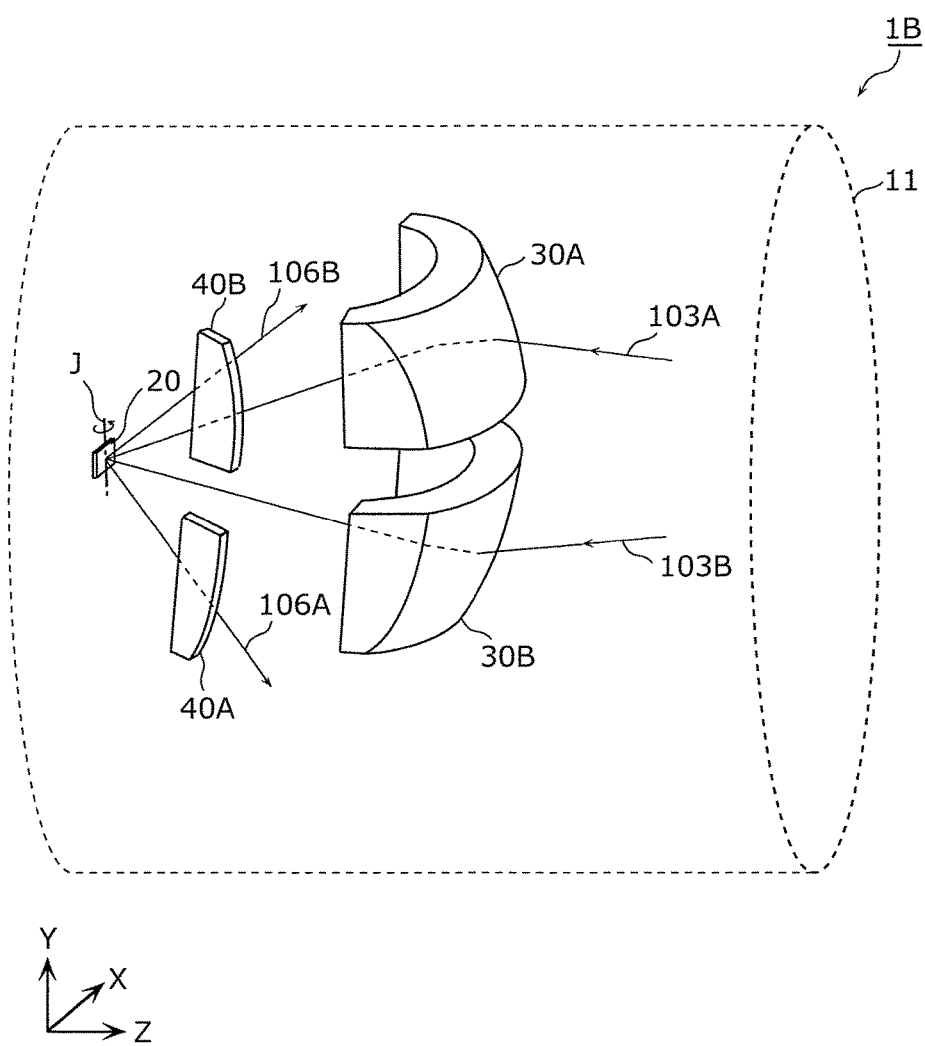
FIG. 9 is a schematic perspective view of one example of a configuration of a laser rangefinder according to Variation 2 of Embodiment 1.

FIG. 9 is a schematic perspective view of one example of the configuration of the laser rangefinder 1B according to Variation 2 of Embodiment 1. Note that FIG. 9 also illustrates the enclosure 11 of the laser rangefinder 1B as transparent so as to show the internals of the enclosure 11. In FIG. 7, illustrations of the light source 10, the fixed mirror 50, the third lens 60, and the photodetector 70 are omitted. FIG. 10 illustrates the arrangement of the scanning mirror 20, the first lens 30A, the first lens 30B, the second lens 40A, and the second lens 40B, as well as optical paths a1 through a4. Note that for illustrative purposes, in FIG. 10, the optical path of reflected light up to being incident on the scanning mirror 20 and the optical path of reflected light after being reflected by the scanning mirror 20 are shown as being reflected about the scanning mirror 20 in the center. FIG. 10 also illustrates vertical cross sections of the first lenses 30A and 30B including optical paths of the laser light 101 and vertical cross sections of the second lenses 40A and 40B including optical paths of the laser light 102.

Figure 10:
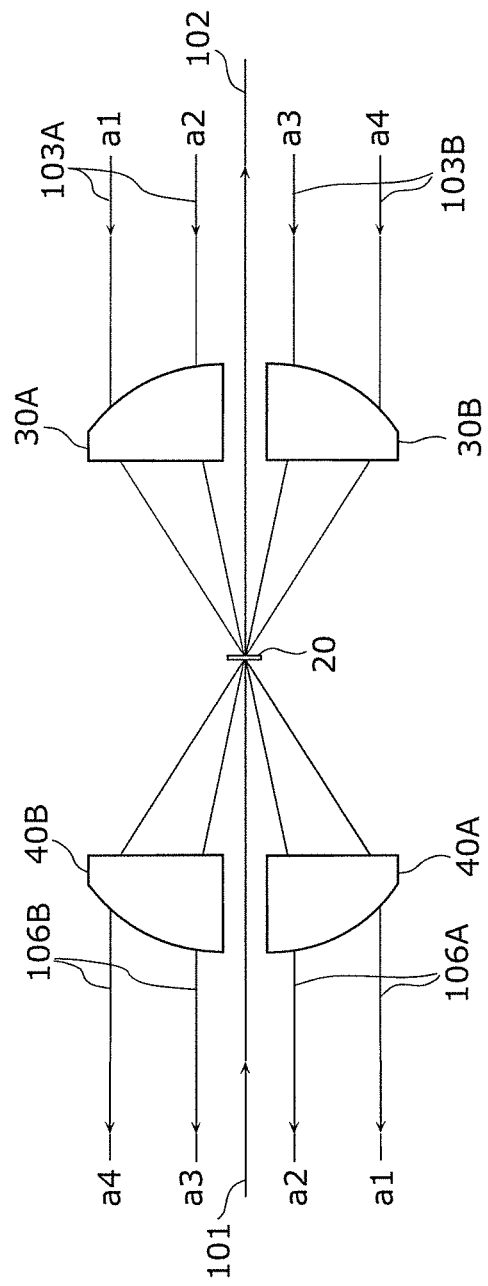
FIG. 10 illustrates an arrangement of a scanning mirror, a first lens, and a second lens according to Variation 2 of Embodiment 1.

As illustrated in FIG. 9 and FIG. 10, the laser rangefinder 1B according to Variation 2 of Embodiment 1 includes a pair of the first lenses 30 and a pair of the second lenses 40 used in Variation 1 of Embodiment 1. Note that the first lenses 30A and 30B each correspond to the first lens 30 according to Variation 1 of Embodiment 1, and the second lenses 40A and 40B each correspond to the second lens 40 according to Variation 1 of Embodiment 1.

In other words, the laser rangefinder 1B according to Variation 2 of Embodiment 1 includes a plurality of pairs (two pairs in Variation 2 of Embodiment 1) of the first lens 30 and the second lens 40, directions toward each of which from the scanning mirror 20 do not overlap in a vertical direction (i.e., the positive direction of the Y axis). More specifically, the laser rangefinder 1B according to Variation 2 of Embodiment 1 includes a first pair including the first lens 30A and the second lens 40A and a second pair including the first lens 30B and the second lens 40B.

Here, the first pair and the second pair are symmetrically disposed about a normal to the reflective surface of the scanning mirror 20, in a vertical direction. In other words, the laser rangefinder 1B according to Variation 2 of Embodiment 1 includes two identical optical systems disposed so as to have horizontal symmetry. More specifically, reflected light 103A from the target object 2 is condensed onto the scanning mirror 20 by the first lens 30A in the first pair and 103B and reflected light 103B from the target object 2 is condensed onto the scanning mirror 20 by the first lens 30B in the second pair. Diverging light reflected by the scanning mirror 20 is condensed by the second lens 40A in the first pair and the second lens 40B in the second pair to produce collimated light 106A and collimated light 106B, which then reaches the photodetector (not shown in the Drawings) via the fixed mirror (not shown in the Drawings) and a third condensing mirror (not shown in the Drawings).

In this way, in Variation 2 of Embodiment 1, by disposing a plurality of identical optical systems so as to have horizontal symmetry, a greater degree of reflected light reflected from the target object 2 can be received. Thus, the distance to an even more distant, target object 2 can measured.

Here, as illustrated in FIG. 10, regarding the positions (in the positive direction of the Y axis) of optical paths a1, a2, a3, and a4 before reflecting off the scanning mirror 20, optical path a1 of the reflected light 103A is the highest, optical path a2 of the reflected light 103A is the second highest, optical path a3 of the reflected light 103B is the third highest, and optical path a4 of the reflected light 103B is the fourth highest, but after being reflected by the scanning mirror 20, this positional relationship reverses such that optical path a4 is the highest, optical path a3 is the second highest, optical path a2 is the third highest, and optical path a1 is the fourth highest.

Similar to Embodiment 1, since, in the laser rangefinder 1B according to Variation 2 of Embodiment 1 configured as described above, the first lenses 30A and 30B and the second lenses 40A and 40B are disposed in positions other than positions on the optical path of laser light 101 between the point of emission from the light source 10 and the point of exit from the laser rangefinder 1B, the laser rangefinder 1B according to Variation 2 of Embodiment 1 achieves the same advantageous effects as Embodiment 1.

Note that in Variation 2 of Embodiment 1, the laser rangefinder 1B is exemplified as including two pairs of identical optical systems, but the laser rangefinder 1B may include three or more pairs of identical optical systems.

Embodiment 2

Here, the laser rangefinder according to Embodiment 2 will be described with reference to FIG. 11 through FIG. 14.

Figure 11:
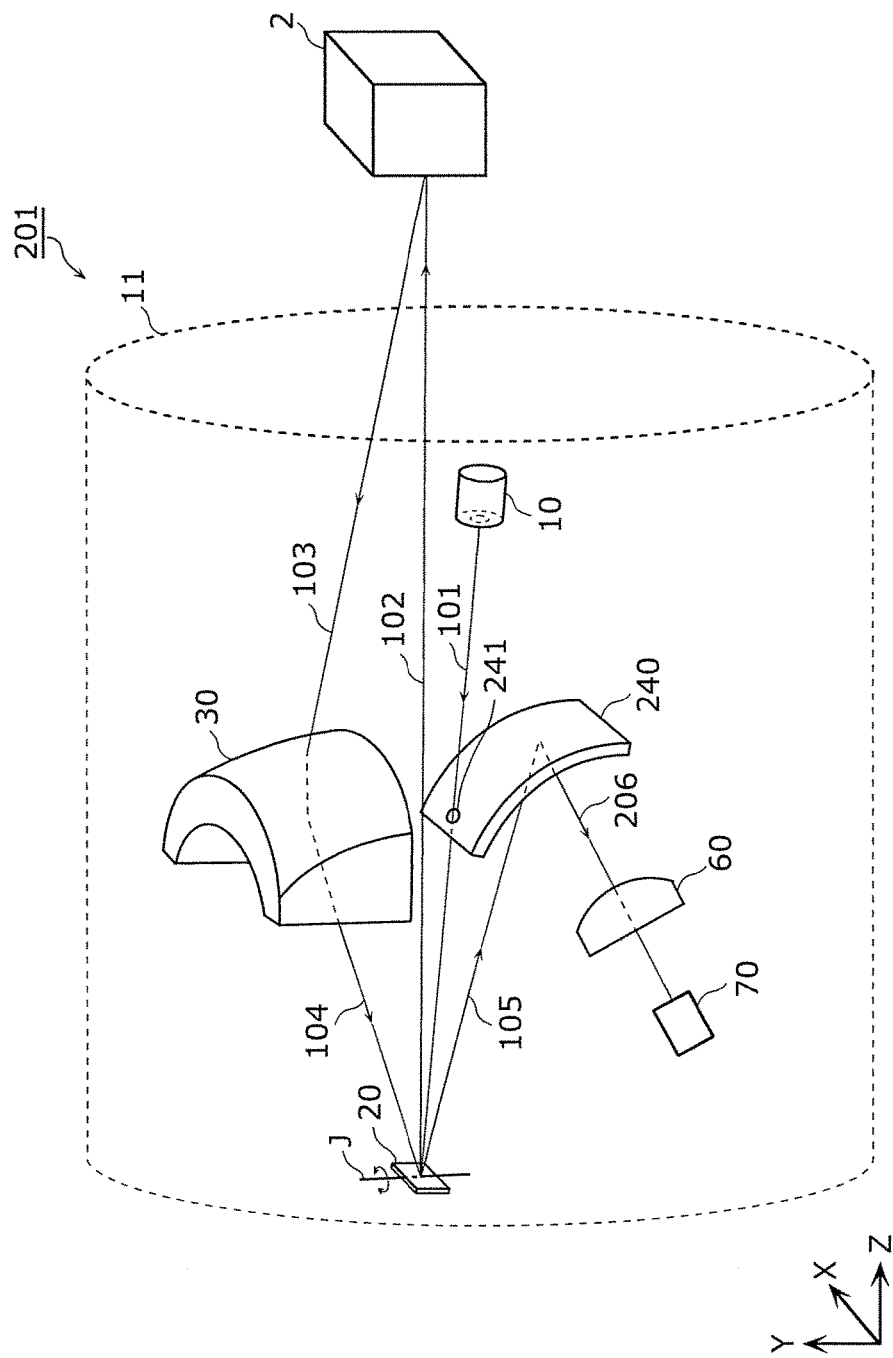
FIG. 11 is a schematic perspective view of one example of a configuration of a laser rangefinder according to Embodiment 2.
Figure 12:
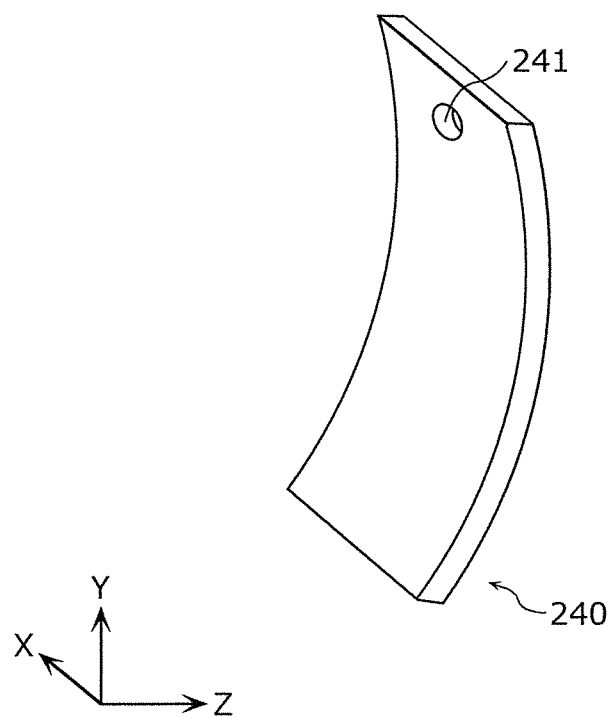
FIG. 12 is a perspective view illustrating a structure of a condensing mirror according to Embodiment 2.

FIG. 11 is a schematic perspective view of one example of the configuration of the laser rangefinder 201 according to Embodiment 2. Note that the target object 2 of the laser rangefinder 201 is also illustrated in FIG. 11. FIG. 11 also illustrates the enclosure 11 of the laser rangefinder 201 as transparent so as to show the internals of the enclosure 11. FIG. 12 is a perspective view illustrating the structure of the condensing mirror 240 (to be described later) according to Embodiment 2.

As illustrated in FIG. 11, the laser rangefinder 201 according to Embodiment 2 is substantially similar to the laser rangefinder 1 according to Embodiment 1, but differs in that it includes the condensing mirror 240 instead of the second lens 40. Here, the laser rangefinder 201 according to Embodiment 2 will be described based on its differences with the laser rangefinder 1 according to Embodiment 1.

The condensing mirror 240, which is one example of the second optical component, is disposed on an optical path of second reflected light (in Embodiment 2, reflected light 105) and condenses the second reflected light (reflected light 105). The second reflected light refers to the first reflected light condensed by the first lens 30 (in Embodiment 2, reflected light 104) and reflected by the scanning mirror 20. As illustrated in FIG. 11 and FIG. 12, the condensing mirror 240 has an aperture 241 through which the laser light 101 from the light source 10 passes and reaches the scanning mirror 20. For example, a cylindrical concave lens having light condensing properties in vertical directions and having the aperture 241 formed therethrough may be used as the condensing mirror 240.

Figure 13:
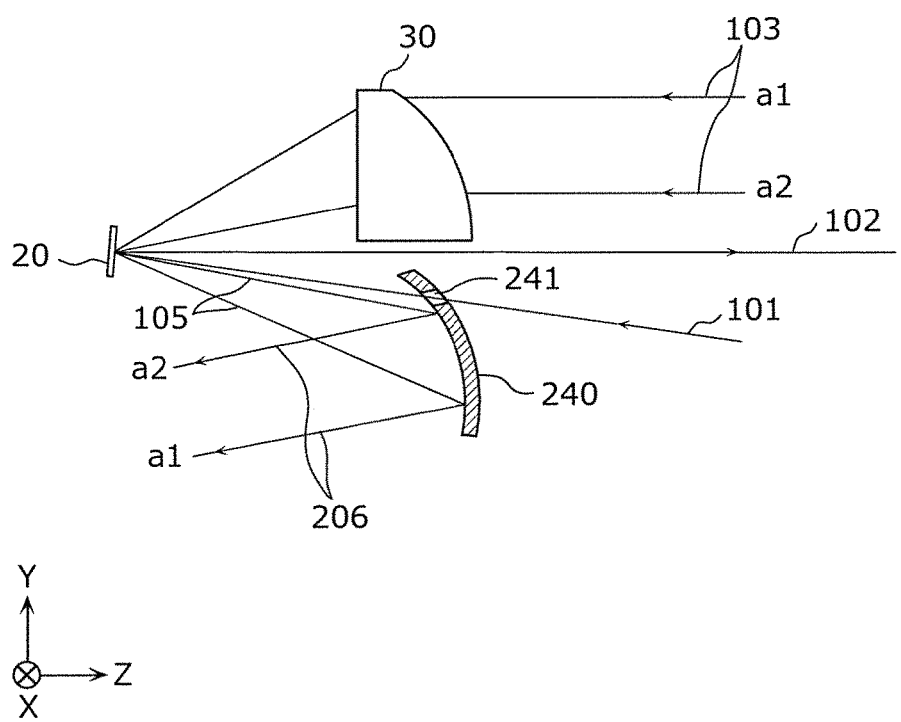
FIG. 13 illustrates YZ plane optical paths in a laser rangefinder according to Embodiment 2.

Next, the arrangement of the first lens 30 and the condensing mirror 240 will be described with reference to FIG. 11 and FIG. 13. FIG. 13 illustrates YZ plane optical paths in the laser rangefinder 201 according to Embodiment 2.

As illustrated in FIG. 11 and FIG. 13, the first lens 30 and the condensing mirror 240 are disposed in positions other than positions on the optical path of laser light 101 between the point of emission from the light source 10 and the point of exit from the laser rangefinder 201. In other words, the laser light 101 emitted from the light source 10 exits the laser rangefinder 201 without passing through a light-transmissive optical component.

More specifically, as illustrated in FIG. 11 and FIG. 13, the first lens 30 and the condensing mirror 240 are disposed in different positions in a vertical direction. Here, unlike the example in Embodiment 1, the laser light 101 from the light source 10 reaches scanning mirror 20 after passing through the aperture 241 in the condensing mirror 240. Similar to Embodiment 1, however, the laser light 102 from the scanning mirror 20 passes through a void formed between the first lens 30 and the condensing mirror 240 and exits the laser rangefinder 201.

The condensing mirror 240 has light condensing properties in vertical directions, and condenses incident reflected light 105, which exhibits divergence, from the scanning mirror 20 to produce collimated light 206.

Similar to Embodiment 1, since, in the laser rangefinder 201 according to Embodiment 2 configured as described above, the first lens 30 and the condensing mirror 240 are disposed in positions other than positions on the optical path of laser light 101 between the point of emission from the light source 10 and the point of exit from the laser rangefinder 201, the laser rangefinder 201 according to Embodiment 2 achieves the same advantageous effects as Embodiment 1.

Figure 14:
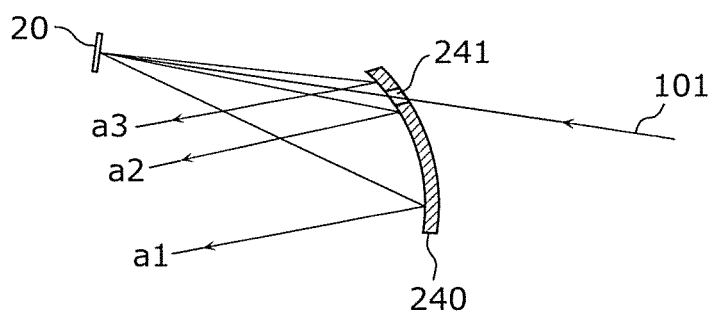
FIG. 14 illustrates advantageous effects achieved by a laser rangefinder according to Embodiment 2.

As described above, in the laser rangefinder 201 according to Embodiment 2, the condensing mirror 240 has an aperture 241 through which the laser light 101 from the light source 10 passes and reaches the scanning mirror 20. The advantageous effects of this configuration will be described with reference to FIG. 14. FIG. 14 illustrates advantageous effects achieved by the laser rangefinder 201 according to Embodiment 2. More specifically, FIG. 14 illustrates YZ plane optical paths of light with regard to the condensing mirror 240 according to Embodiment 2.

As illustrated in FIG. 14, among the reflected light 105 from the scanning mirror 20, the condensing mirror 240 reflects reflected light traveling on the optical path a3 positioned higher (i.e., positioned further in the positive direction of the Y axis) than the optical path of laser light 101 in addition to reflecting reflected light traveling on the optical paths a1 and a2 positioned lower (i.e., positioned further in the negative direction of the Y axis) than the optical path of laser light 101. In other words, the amount of collimated light 206 guided to the photodetector 70 can be increased. Thus, with the laser rangefinder 201 according to Embodiment 2, the distance to an even more distant target object 2 can be measured.

Note that the end of the condensing mirror 240 closest to the first lens 30 may be a horizontal surface positioned in the vicinity of the scanning area of the laser light 102. In other words, the end surface of the condensing mirror 240 closest to the first lens 30 may be a horizontal surface (a surface parallel to the YZ plane).

Embodiment 3

Here, the laser rangefinder according to Embodiment 3 will be described with reference to FIG. 15 through FIG. 24.

1. Overall Configuration of the Laser Rangefinder

First, the configuration of the laser rangefinder 301 according to Embodiment 3 will be described with reference to FIG. 15.

Figure 15:
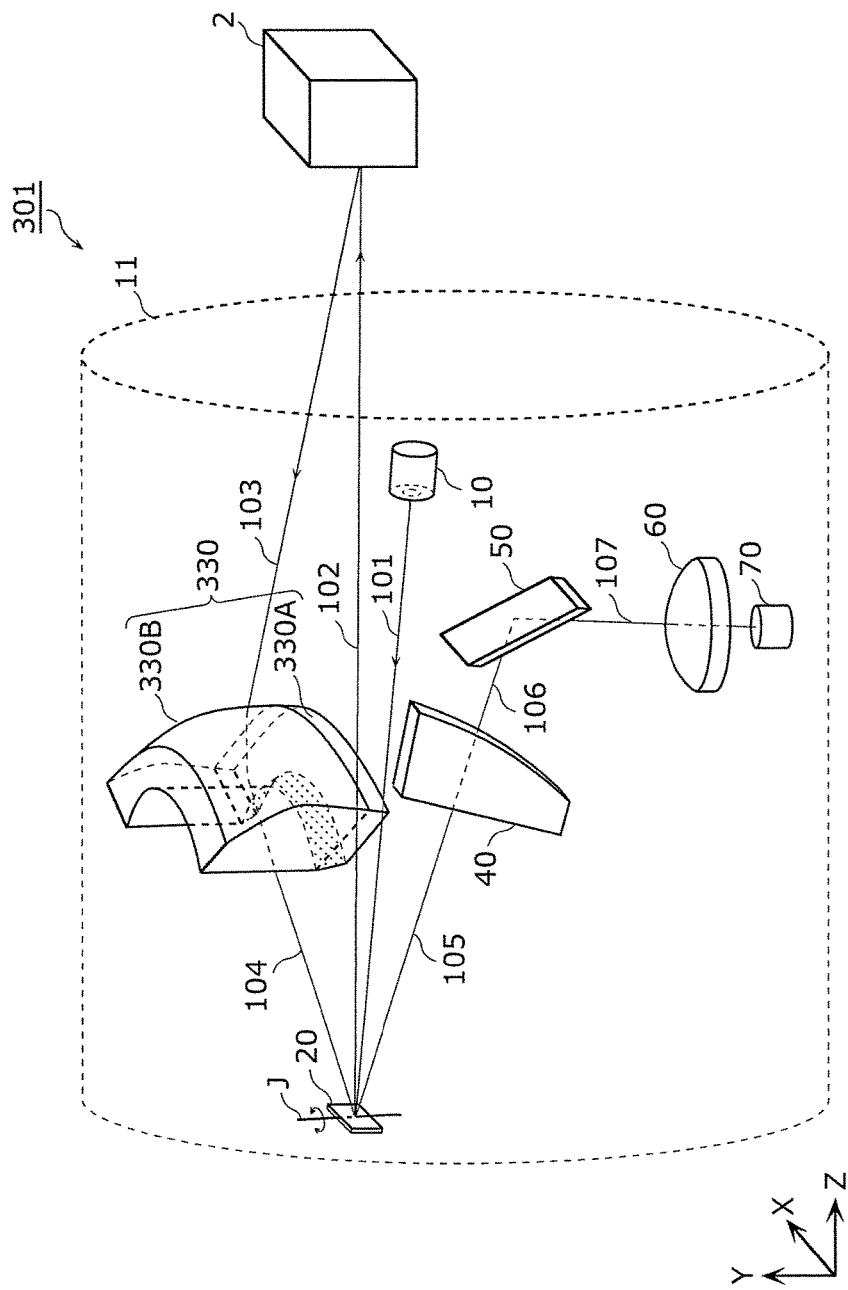
FIG. 15 is a schematic perspective view of one example of a configuration of a laser rangefinder according to Embodiment 3.

FIG. 15 is a schematic perspective view of one example of the configuration of the laser rangefinder 301 according to Embodiment 3. Note that FIG. 15 also illustrates the target object 2 to which distance from the laser rangefinder 301 is measured by the laser rangefinder 301. Similar to FIG. 1, In FIG. 15, the enclosure 11 of the laser rangefinder 301 is illustrated as transparent so as to show the internals of the enclosure 11, the Z axis is illustrated as being parallel to the scanning axis (reference direction) of the laser rangefinder 301, and the Y axis is illustrated as being parallel to the vertical directions (directions in which gravity works in an installed state).

As illustrated in FIG. 15, the laser rangefinder 301 according to Embodiment 3 is substantially similar to the laser rangefinder 1 according to Embodiment 1, but differs in that it includes a first lens 330 instead of the first lens 30.

In Embodiment 3, the first lens 330 includes a bottom section 330A (to be described later) integrally formed with a top section 330B (to be described later). By integrally forming the bottom section 330A and the top section 330B, the number of components used can be reduced and manufacturing of the first lens 330 can be simplified.

The bottom section 330A corresponds to the first lens 30 according to Embodiment 1. More specifically, the bottom section 330A is disposed on the optical path of the laser light 102 scanned by the scanning mirror 20 and has a thickness, measured along an optical path of light in a plane perpendicular to the axis of oscillation J of the scanning mirror 20, which increases with proximity to the edges of the scanning area of the laser light 102 scanned by the scanning mirror 20.

The top section 330B, which is one example of the first optical component, condenses, in a direction parallel to the extending direction of the optical axis 3 (i.e., in vertical directions), the light laser light 102 scanned through the bottom section 330A and then reflected back from the target object 2, and has a thickness, in a plane perpendicular to a vertical direction (i.e., in a horizontal plane), which varies in accordance with the bottom section 330A. With this configuration, the first lens 330 can produce light across an angle broader than the scan angle of the laser light 102 scanned by the scanning mirror 20. Note that the structure of the first lens 330 will be described in detail later.

In Embodiment 3, the second lens 40, which is one example of the second optical component, is disposed on an optical path of reflected light (in Embodiment 3, reflected light 105) and condenses the reflected light 105. The reflected light refers to the reflected light condensed by the first lens 330 (in Embodiment 2, reflected light 104) and reflected by the scanning mirror 20.

Here, since the top section 330B of the first lens 330 condenses, in a direction parallel to the extending direction of the optical axis J, the reflected light from the target object 2, the top section 330B is required to have positive power in a direction parallel to the axis of oscillation J of the scanning mirror 20 (in Embodiment 1, in a vertical direction). The second lens 40 is also required to have positive power in a direction parallel to the axis of oscillation J. The third lens 60 is also required to have positive power.

2. Lens Arrangement

Figure 16:
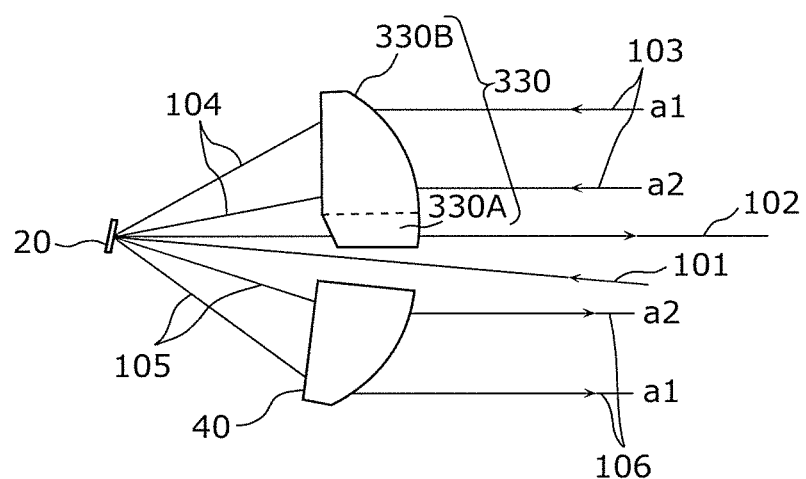
FIG. 16 illustrates YZ plane optical paths in a laser rangefinder according to Embodiment 3.
Figure 16:
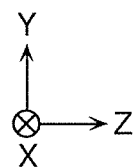

Next, the arrangement of the first lens 330 and the second lens 40 will be described with reference to FIG. 16. FIG. 16 illustrates YZ plane optical paths in the laser rangefinder 301 according to Embodiment 3.

As illustrated in FIG. 16, the first lens 330 and the second lens 40 are disposed in positions other than positions on the optical path of laser light 101 between the point of emission from the light source 10 and the point of incidence on the scanning mirror 20.

More specifically, as illustrated in FIG. 15 and FIG. 16, the first lens 330 (the bottom section 330A and the top section 330B) and the second lens 40 are disposed in different positions in a vertical direction, and the laser light 101 from the light source 10 reaches the scanning mirror 20 after passing through a void formed between the first lens 330 and the second lens 40.

Here, the laser light 101 and the laser light 102 are linearly-polarized light, the strength of which is relatively strong. In contrast, as a result of the laser light 102 being reflected and scattered by the target object 2, the reflected light 103 from the target object 2 is very faint scattered light.

As such, in Embodiment 3, the reflected light 103, which is scattered light, is condensed by the first lens 330 onto the scanning mirror 20 as reflected light 104. Moreover, the light produced by the scanning mirror 20 as a result of the scanning mirror 20 reflecting the reflected light 104—that is to say, the diffused reflected light 105 from the scanning mirror 20—is condensed by the second lens 40 and guided to the photodetector 70. With this, a sufficient amount of light for detection can be secured by the photodetector 70 with Embodiment 3.

Furthermore, in Embodiment 3, by disposing the first lens 330 and the second lens 40 in positions other than positions on an optical path of the laser light 101 emitted from the light source 10, a sufficient amount of light for detection can be absolutely secured by the photodetector 70. In other words, distance measurement can be performed even when the reflected light 103 from the target object 2 is very weak due to the target object 2 being distant from the laser rangefinder 301.

Moreover, in Embodiment 3, the light source 10 is disposed such that the optical axis of the emitted laser light 101 is oblique to a plane perpendicular to the axis of oscillation J of the scanning mirror 20. With this, the optical path of the laser light 101 from the light source 10 to the scanning mirror 20, the optical path of the laser light 102 from the scanning mirror 20, the optical path of the reflected light 103 from the target object 2 to the scanning mirror 20 (i.e., the optical path of the reflected light 103 and the reflected light 104), and the optical path of the reflected light from the scanning mirror 20 (i.e., the optical path of the reflected light 105, the collimated light 106, and the collimated light 107) can be arranged independent of each other, without intersecting each other. In other words, these optical paths can be formed to be separate from each other. Thus, lenses required for each optical path can be appropriately provided on said optical paths.

Here, with the configuration and arrangement of the first lens 330 and the second lens 40 described above, among optical paths a1 and a2 of the reflected light 103, optical path a1 is in a higher position (further in the positive direction of the Y axis) than optical path a2 up to the scanning mirror 20, but after the light is reflected by the scanning mirror 20, optical path a1 is in a lower position than optical path a2, as illustrated in FIG. 16.

Mechanism for Widening the Angle of the Scanning Area

Next, how the laser rangefinder 301 according to Embodiment 3 can widen the angle of the scanning area will be described with reference to the structure of the first lens 330 in detail.

2-3. Details Regarding the Structure of the First Lens

Figure 17:
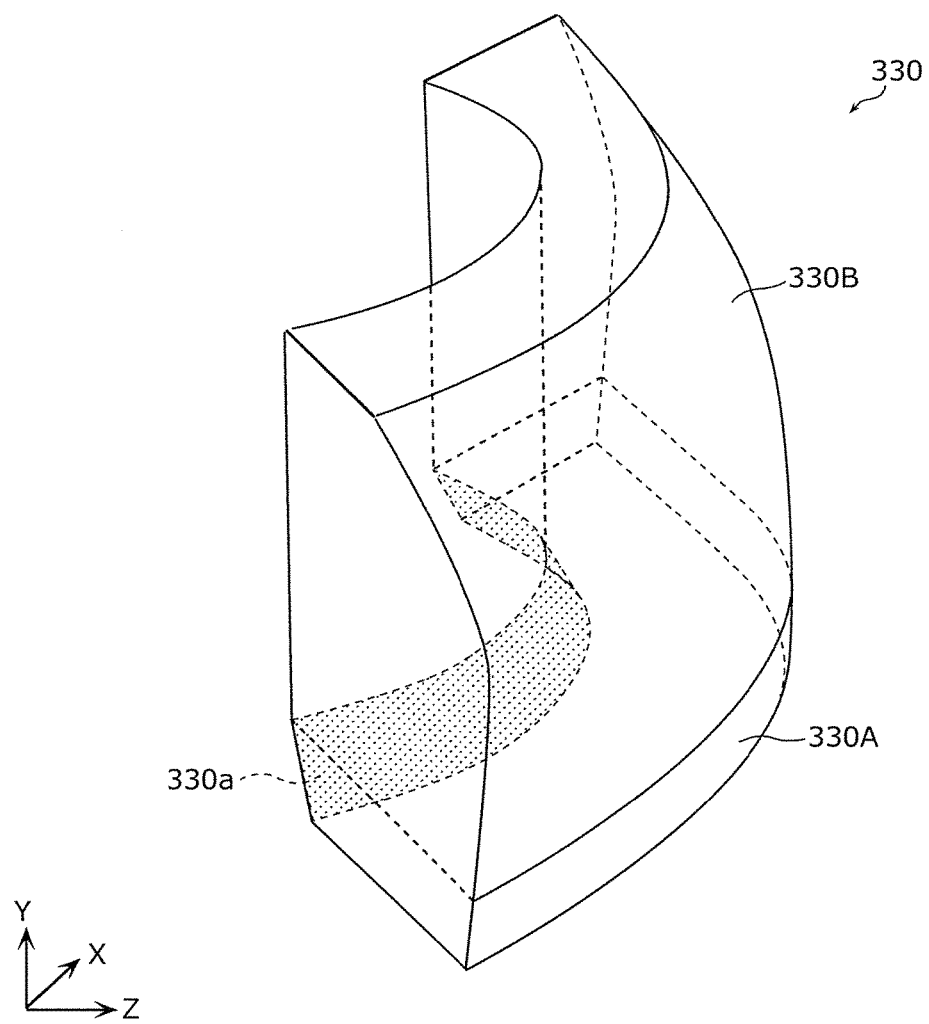
FIG. 17 is a perspective view of a first lens according to Embodiment 3.
Figure 18:
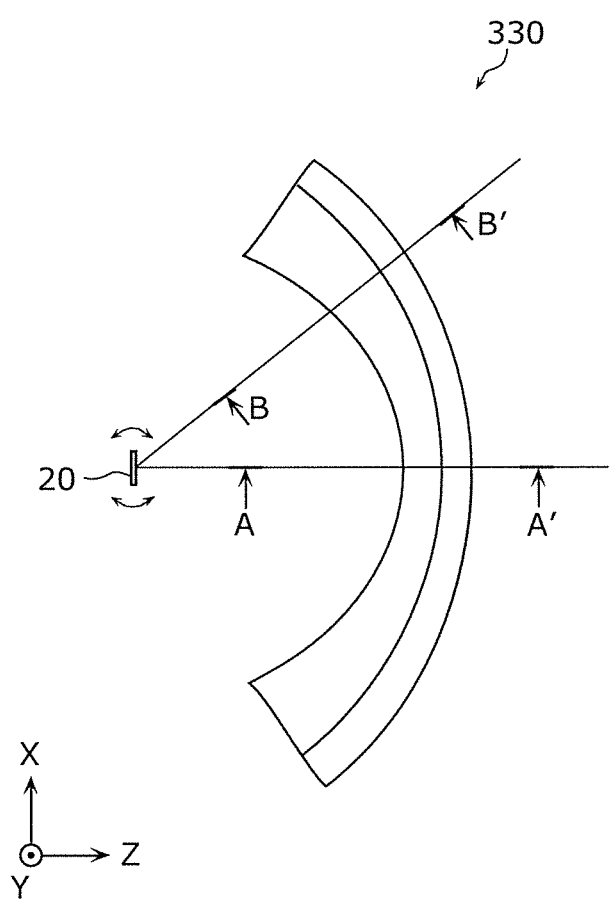
FIG. 18 is a top view of a first lens according to Embodiment 3.
Figure 19A:
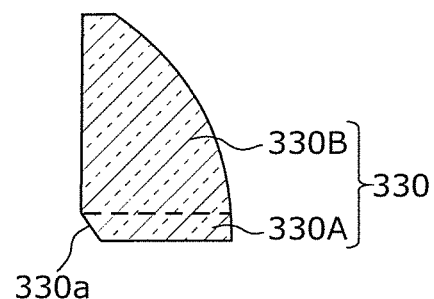
FIG. 19A is a cross sectional view of a first lens taken at line A-A' in FIG. 18.
Figure 19B:
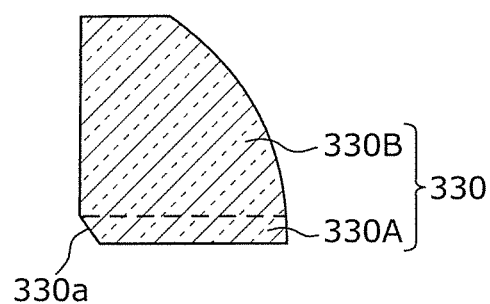
FIG. 19B is a cross sectional view of a first lens taken at line B-B' in FIG. 18.

First, the structure of the first lens 330 will be described in detail with reference to FIG. 17 through FIG. 19B. FIG. 17 is a perspective view of the first lens 330 according to Embodiment 3. FIG. 18 is a top view of the first lens 330 according to Embodiment 3. More specifically, FIG. 18 is a top view of the first lens 330 from the positive side of the Y axis. FIG. 19A is a cross sectional view of the first lens 330 taken at line A-A' in FIG. 18. FIG. 19B is a cross sectional view of the first lens 330 taken at line B-B' in FIG. 18. Note that for illustrative purposes, in FIG. 17, the region defined by the surface of incidence 330a of the bottom section 330A on which the laser light 102 is incident is shaded. Moreover, for illustrative purposes, FIG. 18 also shows the scanning mirror 20.

As illustrated in FIG. 17, the first lens 330 includes the bottom section 330A and the top section 330B, which are integrally formed together. Moreover, as illustrated in FIG. 18, FIG. 19A, and FIG. 19B, the first lens 330 increases in thickness from the center outward toward the ends. With this, the refractive power of the first lens 330 increases from the center outward toward the ends. Next, the structures of the bottom section 330A and the top section 330B will be described in detail.

The bottom section 330A is a substantially flat, plate-like lens formed substantially circular arc shape, and is disposed on an optical path of the laser light 102 scanned by the scanning mirror 20. Here, the bottom section 330A has a vertical dimension that is substantially even throughout, and a horizontal dimension that increases with proximity to the ends. In other words, the bottom section 330A, which is one example of the fourth optical component, has a thickness, measured along an optical path of the laser light 102 in a plane parallel to a horizontal direction, which increases with proximity to ends of the scanning area of the laser light 102 scanned by the scanning mirror 20.

Moreover, a normal to the surface of incidence 330a of the bottom section 330A on which the laser light 102 is incident is oblique to the optical path of the laser light 102. More specifically, a normal extending from a given position on the surface of incidence 330a is oblique to an optical path of the laser light 102 incident at the same given position. Here, "oblique" refers to an angle greater than 0° and less than 90°.

The top section 330B is a condensing lens disposed on the bottom section 330A (on the side in the positive direction of the Y axis) and integrally formed with the bottom section 330A, and condenses, in vertical directions, the reflected light 103 from the target object 2. Here, the top section 330B has a vertical dimension that is substantially even throughout, and, similar to the bottom section 330A, a horizontal dimension that increases with proximity to the ends. In other words, the top section 330B has a thickness, in a plane parallel to a horizontal direction, which varies in accordance with the bottom section 330A.

Moreover, in a cross section of the top section 330B in a plane parallel to a vertical direction and including the axis of oscillation J, the curvature of the surface of incidence of the top section 330B on which the reflected light 103 is incident is, within the scanning area, substantially constant. The surface of incidence of the top section 330B is, for example, a toroidal surface, which is a curved surface resulting when a circle rotates around an axis that does not pass through the center of the circle.

3-2. Optical Path of Emitted Light

Next, optical paths of the laser light 102 passing through the above-described first lens 330 (i.e., optical paths of emitted light) will be described with reference to FIG. 20 and FIG. 21.

Figure 20:
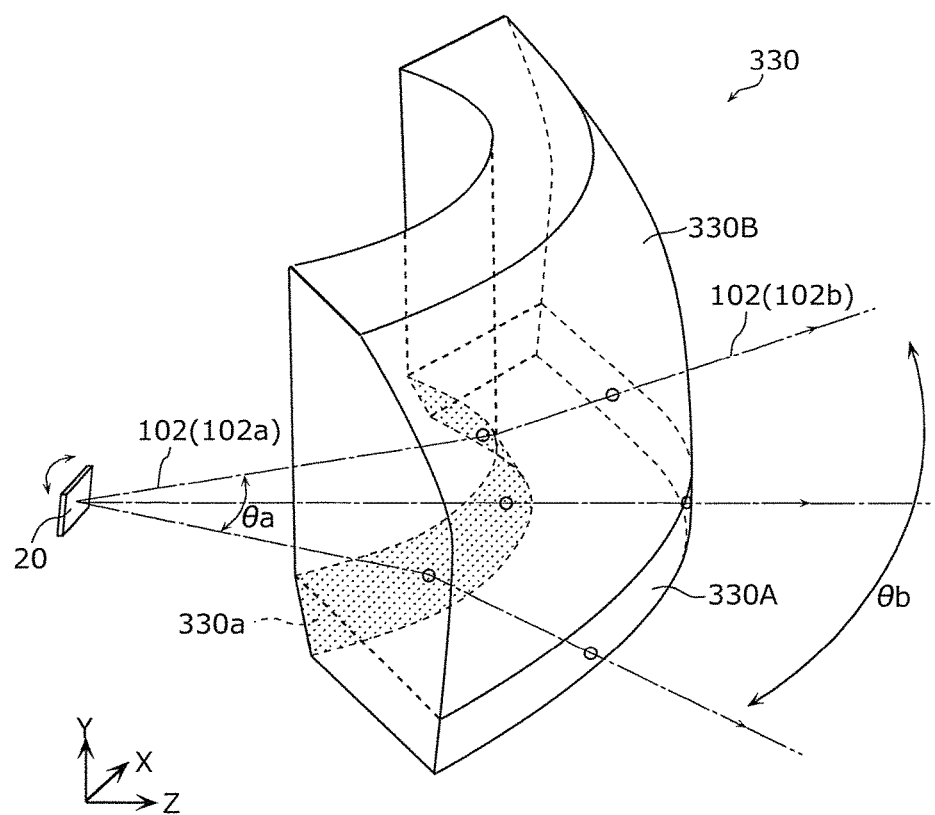
FIG. 20 is a perspective view illustrating laser light passing through a first lens according to Embodiment 3.

FIG. 20 is a perspective view illustrating the laser light 102 passing through the first lens 330 according to Embodiment 3. In FIG. 20, points of incidence and points of exit of the laser light 102 onto and from the first lens 330 are illustrated with small circles. Note that for illustrative purposes, three optical paths of the laser light 102 are shown in FIG. 20, but it goes without saying that, in reality, innumerable optical paths of laser light 102 pass through the first lens 330 throughout the scanning area of the scanning mirror 20. FIG. 21 illustrates YZ plane optical paths of the laser light 102 passing through the first lens 330 according to Embodiment 3. Note that hereinafter, the portion of the laser light 102 between the scanning mirror 20 and the first lens 330 is referred to as laser light 102a, and the portion of the laser light 102 exiting the first lens 330 is referred to as laser light 102b.

As described above, the bottom section 330A has a thickness, measured along an optical path of the laser light 102 in a plane parallel to a horizontal direction, which increases with proximity to ends of the scanning area of the laser light 102 scanned by the scanning mirror 20. With this, the refractive power of the bottom section 330A increases from the center outward toward the ends. In other words, the bottom section 330A has negative power in horizontal directions.

Figure 21:
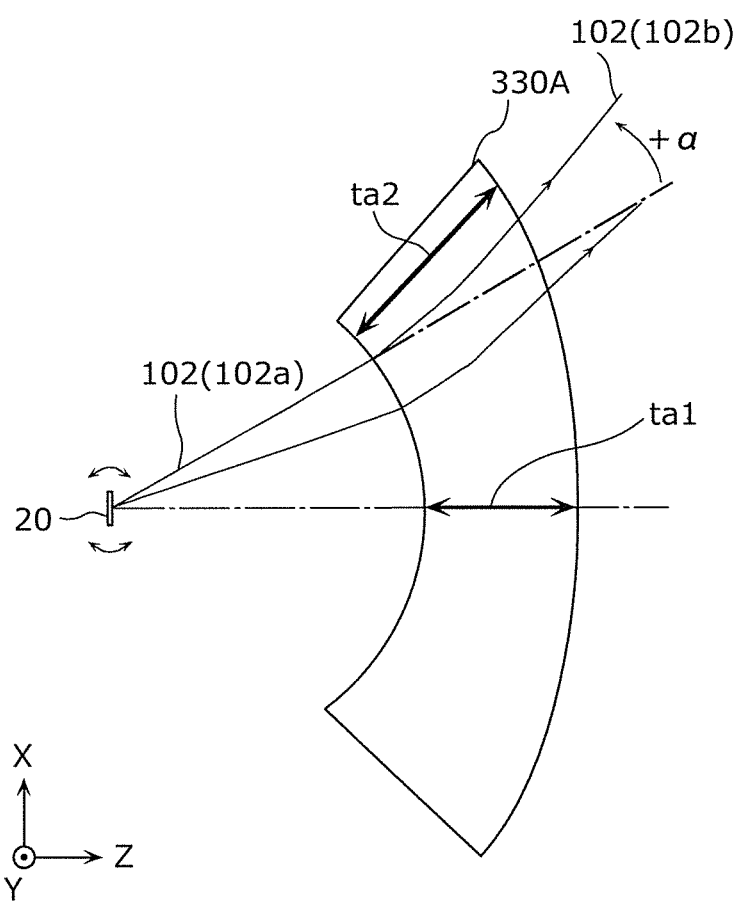
FIG. 21 illustrates YZ plane optical paths of laser light passing through a first lens according to Embodiment 3.

Thus, as illustrated in FIG. 20 and FIG. 21, the laser light 102 incident on the bottom section 330A from the scanning mirror 20 exits the bottom section 330A at an angle wider than the scan angle of the scanning mirror 20. In other words, as illustrated in FIG. 20, the scan angle θb of the laser light 102b from the first lens 330 is greater than the scan angle θa of the laser light 102a from the scanning mirror 20. In other words, as illustrated in FIG. 21, the scan angle of the laser light 102b from the first lens 330 increases by an angle (i.e., increases overall by double the angle α).

In this way, the laser rangefinder 301 according to Embodiment 3 can produce the laser light 102b having a wider angle than the scan angle of the laser light 102a scanned by the scanning mirror 20—that is to say, the oscillating angle of the scanning mirror 20. More specifically, the laser rangefinder 301 according to Embodiment 3 can emit laser light 102 at a wider angle than the oscillating angle of the scanning mirror 20 as a result of the bottom section 330A, which has a thickness ta2 at the ends that is greater than a thickness ta1 in the center, transmitting the laser light 102.

3-3. Optical Path of Light Reception

Next, the state after the laser light 102a scanned by the scanning mirror 20 at the scan angle passes through the first lens 330 as laser light 102b at a wider angle, reflects off the target object 2 and returns to the first lens 330 will be described with reference to FIG. 22 and FIG. 23.

Figure 22:
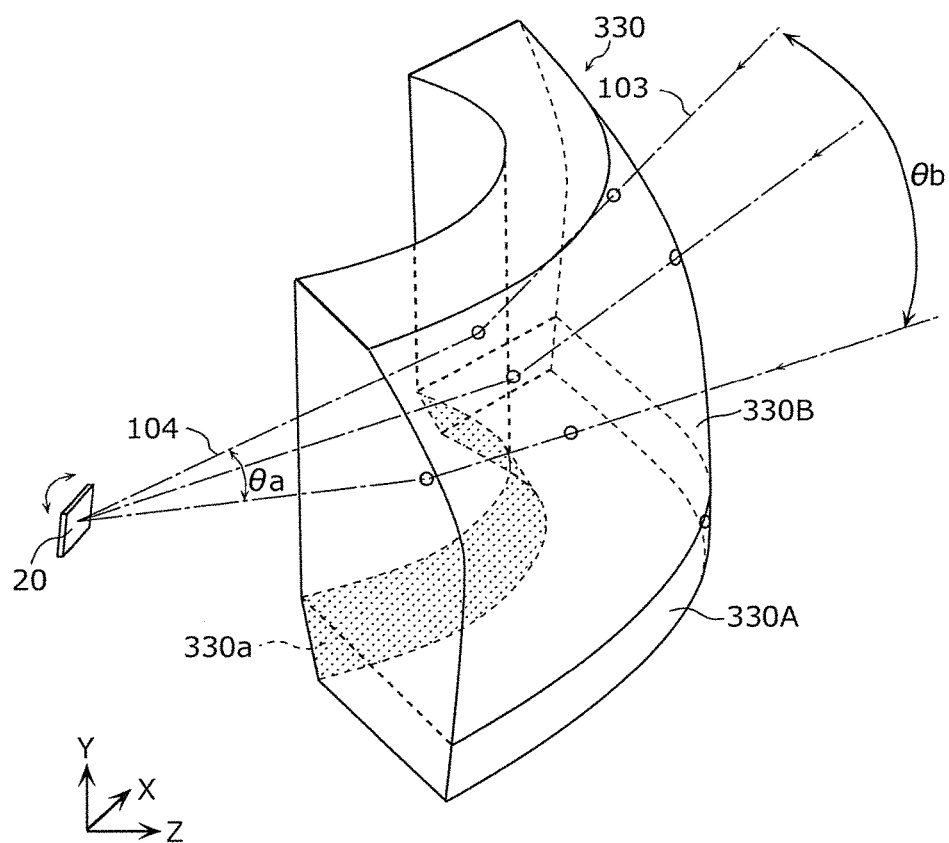
FIG. 22 is a perspective view illustrating reflected light passing through a first lens according to Embodiment 3.

FIG. 22 is a perspective view illustrating the reflected light 103 passing through the first lens 330 according to Embodiment 3. In FIG. 22, points of incidence and points of exit of the reflected light 103 onto the first lens 330 and points of exit of the reflected light 104 from the first lens 330 are illustrated with small circles. Note that for illustrative purposes, only three optical paths of the reflected light 103 and the reflected light 104 corresponding to the reflected light 103 are shown in FIG. 22, but it goes without saying that, in reality, innumerable optical paths of the reflected light 103 and the reflected light 104 corresponding to the reflected light 103 pass through the first lens 330 throughout the scanning area of the laser rangefinder 301. FIG. 23 illustrates YZ plane optical paths of the reflected light 103 passing through the first lens 330 according to Embodiment 3.

As described above, the top section 330B has a thickness, in a plane parallel to a horizontal direction, which varies in accordance with the bottom section 330A. With this, similar to the bottom section 330A, the refractive power of the top section 330B increases from the center outward toward the ends. In other words, similar to the bottom section 330A, the top section 330B has negative power in horizontal directions.

Figure 23:
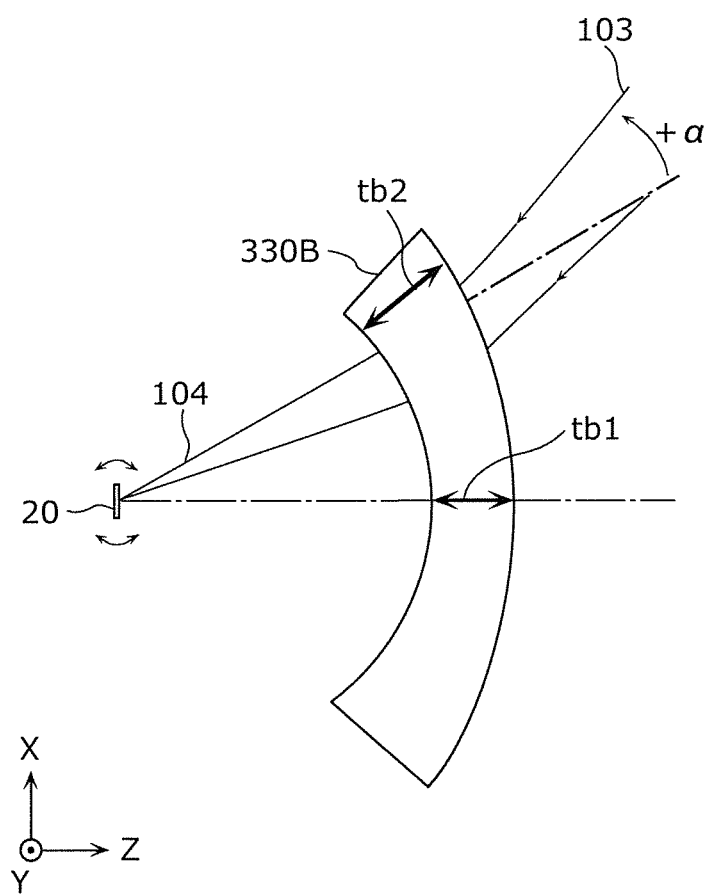
FIG. 23 illustrates YZ plane optical paths of reflected light passing through a first lens according to Embodiment 3.

Thus, as illustrated in FIG. 22 and FIG. 23, in a top view (when viewed from the positive direction of the Y axis), the reflected light 103 from the target object 2 follows the same optical path as the laser light 102b but in the opposite direction, and refracts horizontally as it passes through the first lens 330. With this, in a top view (when viewed from the positive direction of the Y axis), the reflected light 104 exiting the first lens 330 follows the same optical path as the laser light 102 but in the opposite direction and is thus guided to the scanning mirror 20.

In this way, with the laser rangefinder 301 according to Embodiment 3, the reflected light of the laser light 102b having a wider angle than the oscillating angle of the scanning mirror 20 can be guided to the scanning mirror 20, and distance can be measured. More specifically, with the laser rangefinder 301 according to Embodiment 3, by using the top section 330B, whose thickness tb2 at the ends is greater than the thickness tb1 in the center, to guide the reflected light 103 to the scanning mirror 20, the reflected light of the laser light 102b having a wider angle than the oscillating angle of the scanning mirror 20 can be condensed and distance can be measured. In other words, the laser rangefinder 301 according to Embodiment 3 can ensure that a large amount of light is received by the photodetector 70 and can measure distance across a wide angle.

4. Advantageous Effect

As described above, in Embodiment 3, the laser rangefinder 301 is disposed on the optical path of the laser light 102 scanned by the scanning mirror 20, and includes a bottom section 330A whose width in the optical path direction increases with proximity to an end of the scanning area of the laser light scanned by the scanning mirror 20, and a top section 330B that is integrally formed with the bottom section 330A, vertically condenses the reflected light 103 from the target object 2, and has a thickness that varies in accordance with the bottom section 330A.

With this, the surfaces of the bottom section 330A and the top section 330B perpendicular to the axis of oscillation J of the scanning mirror 20 have negative power. The laser light 102b thus has a wider angle than the scan angle of the laser light 102a scanned by the scanning mirror 20—that is to say, the oscillating angle of the scanning mirror 20. Moreover, the reflected light 103 of the laser light 102b having a wider angle than the oscillating angle of the scanning mirror 20 can be vertically condensed, and distance can be measured. In other words, provision of the scanning mirror 20 in the laser rangefinder 301 according to Embodiment 3 allows for a compact laser rangefinder to be achieved and distance measurement to be performed across a wide angle.

In this way, with Embodiment 3, the laser light 102 scanned by the scanning mirror 20 passes through the bottom section 330A whereby the angle of the optical axis changes, as illustrated in FIG. 21. As such, the laser rangefinder 301 according to Embodiment 3 can measure distance across a wider angle than the oscillating angle of the scanning mirror 20.

Moreover, in Embodiment 3, a normal to the surface of incidence 330a of the bottom section 330A is oblique to the optical path of the laser light 102 (102a).

Figure 24:
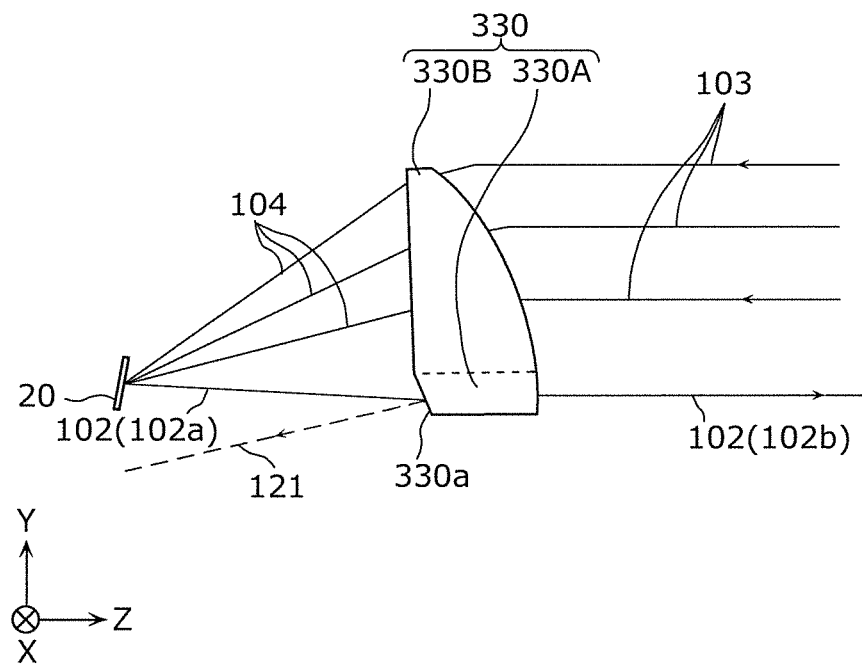
FIG. 24 illustrates the reflection of laser light from a surface of incidence of a first lens according to Embodiment 3.

With this, incorrect measurement due to optical feedback from the laser light 102 (102a) from the bottom section 330A can be inhibited. Reasons for this will be described with reference to FIG. 24. FIG. 24 illustrates the reflection of laser light from the surface of incidence 330a of the first lens 330 according to Embodiment 3.

As illustrated in FIG. 24, the majority of laser light 102a reaching the bottom section 330A from the scanning mirror 20 exits the bottom section 330A as laser light 102b. A portion of the laser light 102a, however, is reflected off the surface of incidence 330a toward the scanning mirror 20 as optical feedback 121.

Here, when the surface of incidence 330a is disposed perpendicular to the optical path of the laser light 102a, there is concern that the optical feedback 121 will reflect off the scanning mirror 20 and be guided to the photodetector 70. In this case, there is concern that incorrect measurement, such as erroneous detection of a target object 2 even when no target object 2 is present in the scanning area or inability to detect a distance target object 2, may arise.

In contrast, in Embodiment 3, the surface of incidence 330a is disposed so as to not be perpendicular to the optical path of the laser light 102a. The surface of incidence 330a is disposed such that a normal to the surface of incidence 330a is oblique to the optical path of the laser light 102 (102a). With this, the concern that optical feedback 121 will reflect off the scanning mirror 20 and be guided to the photodetector 70 can be inhibited, and thus incorrect measurement can be inhibited.

Moreover, according to Embodiment 3, the first lens 330 and the second lens 40 are disposed on opposite sides, in a vertical direction, of the optical path of the laser light 101 from the light source 10. More specifically, the first lens 330 (the bottom section 330A and the top section 330B) and the second lens 40 are disposed in different positions in a vertical direction, and the laser light 101 from the light source 10 reaches the scanning mirror 20 after passing through a void formed between the first lens 330 and the second lens 40.

With this, the laser rangefinder 301 according to Embodiment 3 can be made to be even more compact. In other words, achieving a configuration in which directions from the scanning mirror 20 toward each of the light source 10, the first lens 330, and the second lens 40 can be made to appear approximately coincident when viewed in a vertical direction (i.e., in the positive direction of the Y axis) yields a more compact laser rangefinder 301 than when these directions do not overlap when viewed in the vertical direction. Moreover, since this makes it possible to achieve a wide angle of oscillation of the scanning mirror 20, distance measurement across an even wider angle is possible.

Moreover, in Embodiment 3, the second lens 40 is a positive lens that produces collimated light, and the laser rangefinder 301 further includes a third lens 60 that condenses, onto the photodetector 70, the collimated light produced by the second lens 40.

With this, a BPF can be disposed which allows light having a narrow band of wavelength including the wavelength of the laser light 101 emitted from the light source 10 to pass between the second lens 40 and the third lens 60 and inhibits all other light. Thus, the laser rangefinder 301 according to Embodiment 3 can inhibit adverse effects arising from ambient light and maintain a high accuracy of distance measurement. Here, when the BPF is a multilayer dielectric structure, transmittance is dependent on the angle of incidence. Thus, as a result of the second lens 40 producing collimated light, even when a multilayer dielectric structure is used as the BPF, transmittance can be made even, and adverse effects arising from ambient light can be inhibited and a high accuracy of distance measurement can be maintained.

Variation 1 of Embodiment 3

Figure 25:
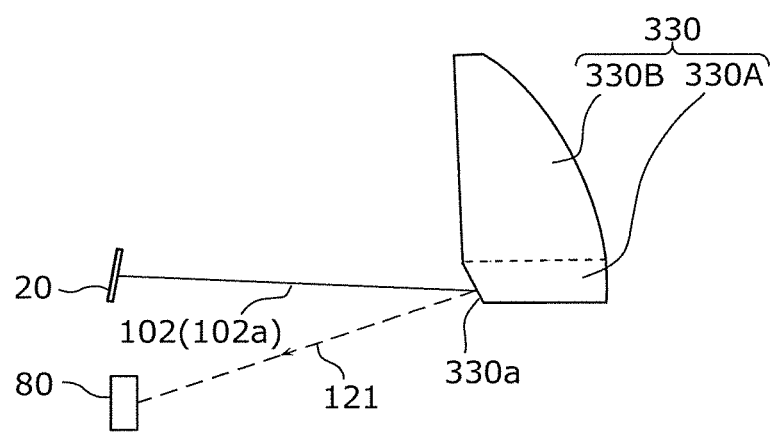
FIG. 25 illustrates the reflection of laser light from a surface of incidence of a first lens according to Variation 1 of Embodiment 3.

The laser rangefinder 301 may include a light shielding wall disposed on the optical path of the optical feedback 121. FIG. 25 illustrates the reflection of laser light 102 (102a) from the surface of incidence 330a of the first lens 330 according to Variation 1 of Embodiment 3.

As illustrated in FIG. 25, the light shielding wall 80 is disposed on the optical path of the optical feedback 121. The light shielding wall 80 inhibits reflection of light with similar wavelength as the laser light 101 emitted from the light source 10, or absorbs light of that wavelength, and is, for example, plate component painted matte black.

By including the light shielding wall 80, the chance that optical feedback 121 may be guided to the photodetector 70 can be inhibited even further. Thus, incorrect measurement can be inhibited even further.

Variation 2 of Embodiment 3

Figure 26:
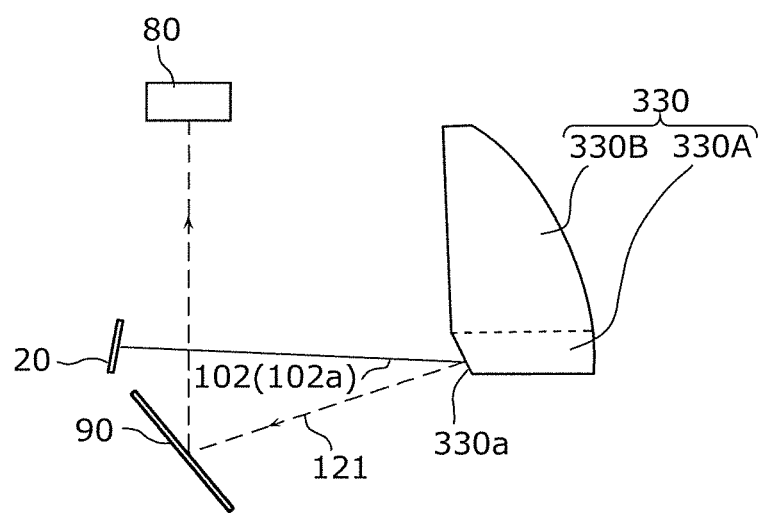
FIG. 26 illustrates the reflection of laser light from a surface of incidence of a first lens according to Variation 2 of Embodiment 3.
Figure 26:
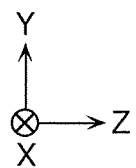

The optical feedback 121 may be directly guided to the light shielding wall 80, such as is the case with Variation 1 of Embodiment 3, and alternatively the optical feedback 121 may be indirectly guided to the light shielding wall 80 via a mirror 90, as illustrated in FIG. 26. FIG. 26 illustrates the reflection of laser light 102 (102a) from the surface of incidence 330a of the first lens 330 according to Variation 2 of Embodiment 3.

With this, the same advantageous effects as Variation 1 of Embodiment 3 can be achieved even when the optical feedback 121 is indirectly guided to the light shielding wall 80 via the mirror 90.

Embodiment 4

Here, the laser rangefinder according to Embodiment 4 will be described. The laser rangefinder according to Embodiment 4 is substantially similar to the laser rangefinder 301 according to Embodiment 3, but differs with regard to the structure of the first lens. Here, the laser rangefinder according to Embodiment 4 will be described based on its differences with the laser rangefinder 301 according to Embodiment 3, with reference to FIG. 27 through FIG. 29B. Note that in Embodiment 4, structural components that are the same as in Embodiment 3 share like reference numbers, and description of such structural components is omitted.

Figure 27:
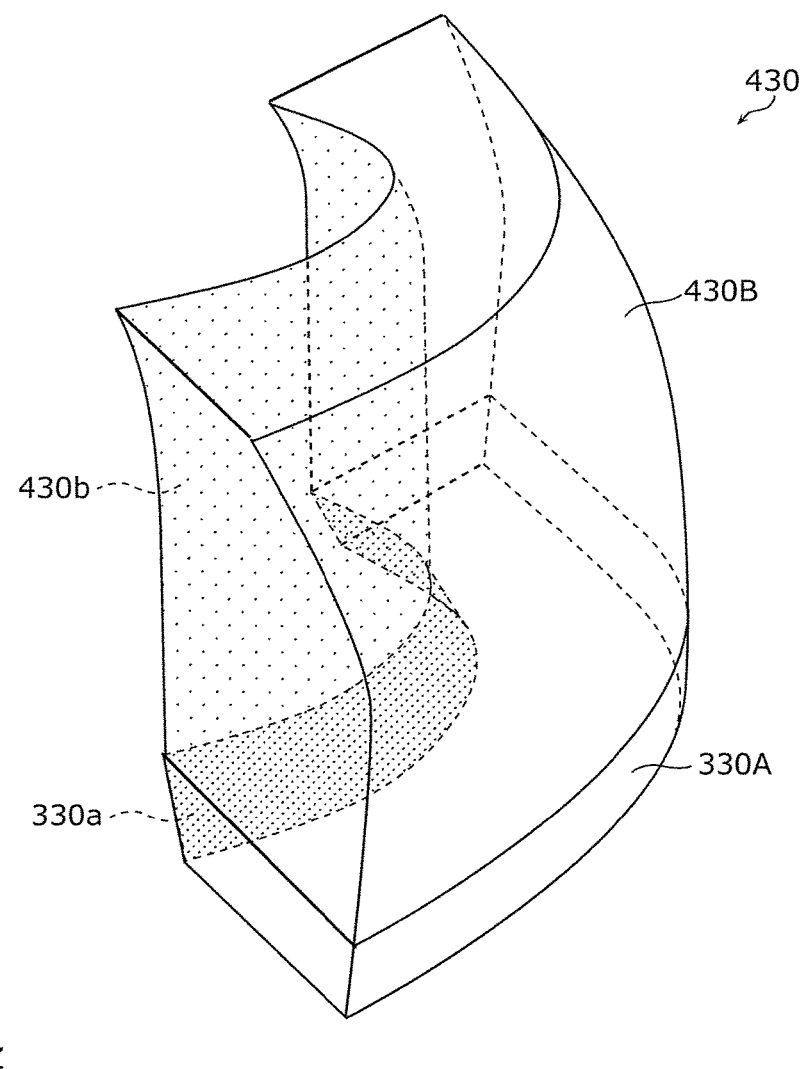
FIG. 27 is a perspective view of a first lens according to Embodiment 4.
Figure 28:
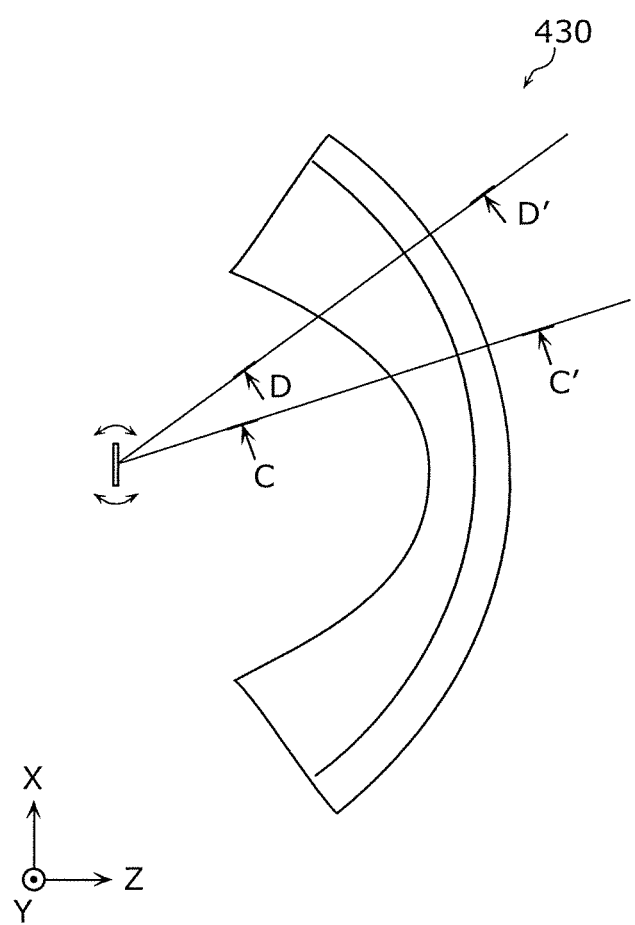
FIG. 28 is a top view of a first lens according to Embodiment 4.
Figure 29A:
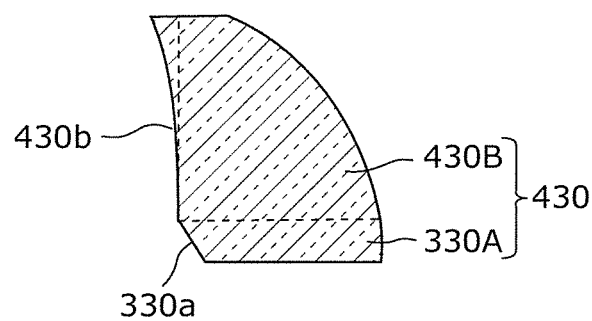
FIG. 29A is a cross sectional view of a first lens taken at line C-C' in FIG. 28.
Figure 29B:
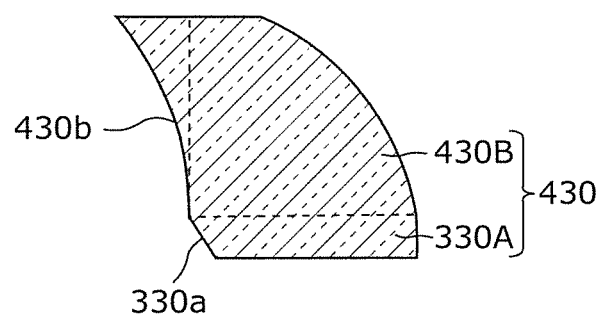
FIG. 29B is a cross sectional view of a first lens taken at line D-D' in FIG. 28.

FIG. 27 is a perspective view of the first lens 430 according to Embodiment 4. FIG. 28 is a top view of the first lens 430 according to Embodiment 4. FIG. 29A is a cross sectional view of the first lens 430 taken at line C-C' in FIG. 28. FIG. 29B is a cross sectional view of the first lens 430 taken at line D-D' in FIG. 28. Note that for illustrative purposes, in FIG. 27, the surface of incidence 330a of the bottom section 330A on which the laser light 102 is incident is shaded, and the surface of emission 430b of the top section 430B (to be described later) from which the reflected light 104 exits is shaded. Moreover, for illustrative purposes, FIG. 28 also shows the scanning mirror 20.

Instead of the top section 330B of the first lens 330 according to Embodiment 3, the first lens 430 includes the top section 430B. In other words, the first lens 430 includes the bottom section 330A integrally formed with the top section 430B.

As illustrated in FIG. 27, the top section 430B differs from the top section 330B according to Embodiment 3 in regard to the shape of the surface of emission 430b, which is the surface from which reflected light 104 exits. In other words, the shape of the surface of the top section 430B that faces the scanning mirror 20 is different.

In other words, in Embodiment 3, the surface of the top section 330B from which reflected light 104 exits has a cross section in a plane including the axis of oscillation J of the scanning mirror 20 that is a substantially straight line. In contrast, in Embodiment 4, the surface of emission 430b of the top section 430B from which reflected light 104 exits has a cross section in a plane including the axis of oscillation J of the scanning mirror 20 that is concave. More specifically, the top section 430B has a cross section in a plane including the axis of oscillation J of the scanning mirror 20 that recedes away from the scanning mirror 20 with decreasing distance toward the bottom (in the negative direction of the Y axis).

Even more specifically, as illustrated in FIG. 28, FIG. 29A, and FIG. 29B, the curvature of the surface of emission 430b in a cross section of the top section 430B in a plane including the axis of oscillation J increases with proximity to an end of the scanning area of the laser light 102 scanned by the scanning mirror 20. In other words, as can be seen from comparing the cross section illustrated in FIG. 29A of the surface of emission 430b taken relatively close to the center of the scanning area and the cross section illustrated in FIG. 29B of the surface of emission 430b taken relatively close to an end of the scanning area, the curvature of the surface of emission 430b is greater at cross sections taken closer to an end of the scanning area.

Here, the top section 430B is thicker at ends of the scanning area than at the central region of the scanning area. In other words, the refractive power of the top section 430B, both horizontally and vertically, increases with proximity to an end of the scanning area. By having the curvature of the concave surface of emission 430b increase with proximity to an end of the scanning area, difference in vertical refraction power can be cancelled out to achieve a more uniform direction. With this, the top section 430B can effectively condense the reflected light 103 onto the scanning mirror 20.

Such a surface of emission 430b may have, for example, a cylindrical concave shape.

As described above, the laser rangefinder according to Embodiment 4 is disposed on the optical path of the laser light 102 scanned by the scanning mirror 20, and includes a bottom section 330A whose width in the optical path direction increases with proximity to an end of the scanning area of the laser light scanned by the scanning mirror 20, and a top section 430B that is integrally formed with the bottom section 330A, vertically condenses the reflected light 103 from the target object 2, and has a thickness that varies in accordance with the bottom section 330A. With this, the laser rangefinder according to Embodiment 4 can achieve the same advantageous effects achieved with Embodiment 3.

Moreover, with the laser rangefinder according to Embodiment 4, the surface of emission 430b of the top section 430B from which reflected light 104 exits has a cross section in a plane including the axis of oscillation J of the scanning mirror 20 that is concave.

With this, the refractive power in a direction parallel to the axis of oscillation J (in Embodiment 4, this is a vertical direction) can be adjusted accordingly.

More specifically, with the laser rangefinder according to Embodiment 4, the curvature of the surface of emission 430b in a cross section in a plane including the axis of oscillation J increases with proximity to an end of the scanning area of the laser light 102 scanned by the scanning mirror 20.

With this, a difference in the refractive power in a direction parallel to the axis of oscillation J (in Embodiment 4, this is a vertical direction) can be cancelled out to achieve a more uniform direction. With this, the top section 430B can effectively condense the reflected light 103 onto the scanning mirror 20. In other words, with the laser rangefinder according to Embodiment 4, distance to an even more distant target object 2 can be measured.

Other Embodiments

Hereinbefore, the laser rangefinder according to the present invention has been described based on exemplary embodiments, but the present invention is not limited to these embodiments and variations thereof.

For example, in the above description, the laser light 101 emitted from the light source 10 reaches the scanning mirror 20 directly, but the laser light 101 may reach the scanning mirror 20 via an optical component such as a mirror or prism. In other words, the laser light 101 may reach the scanning mirror 20 indirectly.

However, by implementing a configuration in which the laser light 101 reaches the scanning mirror 20 directly, stray light reflecting off the surface of the optical component, which can lead to noise in the distance measurement signal, can be inhibited.

Moreover, in the above description, the first lens is given as an example of the first optical component that condenses the reflected light 103 onto the scanning mirror 20, but the first optical component is not limited to this example. For example, a mirror having a toroidal reflective surface or a combination of plurality of mirrors may be used as the first optical component.

Moreover, in the above description, the third lens 60 is given as an example of the third optical component that condenses the collimated light 107, but the third optical component is not limited to this example. For example, a mirror that condenses the collimated light onto the photodetector 70 by reflecting the collimated light may be used as the third optical component.

Moreover, in the above description, the reflected light 105 is transformed in into collimated light 106 by refraction by the positive power second optical component and then condensed onto the photodetector 70 by the third lens 60, but the collimated light 106 may be condensed onto the photodetector 70 by the second optical component without use of the third lens 60.

Moreover, the laser rangefinder according to the present invention may be realized by combining any of the above-described embodiments and variations.

Moreover, for example, the surface of incidence 330a of the bottom section 330A may be treated with an anti-reflective (AR) coating to inhibit reflection of the laser light 102. Moreover, the surface of incidence 330a may be perpendicular to the optical path of the laser light 102 and, alternatively, may be oblique.

Moreover, in the above description, the direction from the scanning mirror 20 toward the first lens 330 and the direction from the scanning mirror 20 toward the second lens 40 appear essentially coincident when viewed in a vertical direction (i.e., in the positive direction of the Y axis). In other words, in the above description, the optical axes of the first lens 330 and the second lens 40 appear essentially coincident when viewed in a vertical direction (i.e., in the positive direction of the Y axis). However, the first lens 330 and the second lens 40 are simply required to disposed on opposite sides, in a vertical direction (a direction parallel to the Y axis), of the optical path of the laser light 101 from the light source 10. In other words, the optical axes of the first lens 330 and the second lens 40 may not overlap when viewed in a vertical direction. This improves flexibility with regard to the placement of the first lens 330 and the second lens 40.

Moreover, a plurality of pairs of lenses, each including the first lens 330 and the second lens 40 and disposed such that the direction from the scanning mirror 20 toward the first lens 330 and the direction from the scanning mirror 20 toward the second lens 40 do not overlap when viewed in a vertical direction (i.e., in the positive direction of the Y axis), may be disposed so as to have vertical symmetry. With this, a greater degree of reflected light reflected from the target object 2 can be received, and the distance to an even more distant target object 2 can measured.

Moreover, the laser rangefinder according to the present invention may be realized by combining any of the above-described embodiments and variations, such as a combination of Embodiment 1 and Embodiment 3.

Although only some exemplary embodiments of the present invention have been described in detail above, those skilled in the art will readily appreciate that many modifications are possible in the exemplary embodiments without materially departing from the novel teachings and advantages of the present invention. Accordingly, all such modifications are intended to be included within the scope of the present invention.

INDUSTRIAL APPLICABILITY

The present invention is applicable to laser rangefinders that measure distance to an object and to profilometers that measure the shape of an object by measuring distances to points on the object.

The invention claimed is:

1. A laser rangefinder that measures a distance to a target object, the laser rangefinder comprising:
    a light source that emits laser light;
    an oscillating mirror that scans the laser light emitted from the light source by oscillating about an axis of oscillation extending in a predetermined direction;
    a first optical component that is disposed on an optical path of first reflected light and condenses the first reflected light onto the oscillating mirror, the first reflected light being the scanned laser light reflected from the target object;
    a second optical component that is disposed on an optical path of second reflected light and condenses the second reflected light, the second reflected light being the condensed first reflected light reflected from the oscillating mirror; and
    a photodetector that receives the second reflected light condensed by the second optical component,
    wherein the first optical component and the second optical component are disposed in positions other than positions on an optical path of the laser light between a point of emission from the light source and a point of exit from the laser rangefinder.

2. The laser rangefinder according to claim 1, wherein the laser light emitted from the light source exits the laser rangefinder without passing through a light-transmissive optical component.

3. The laser rangefinder according to claim 1, wherein the first optical component and the second optical component are disposed on opposite sides, in the predetermined direction, of an optical path of the laser light scanned by the oscillating mirror.

4. The laser rangefinder according to claim 3, wherein the first optical component and the second optical component are disposed in different positions in the predetermined direction, and
    the laser light is scanned by the oscillating mirror, passes through a void formed between the first optical component and the second optical component, and then exits the laser rangefinder.

5. The laser rangefinder according to claim 4, wherein the laser light is emitted from the light source, passes through the void, and then reaches the oscillating mirror.

6. The laser rangefinder according to claim 4, wherein the second optical component has an aperture, and
    the laser light is emitted from the light source, passes through the aperture, and then reaches the oscillating mirror.

7. The laser rangefinder according to claim 3, wherein
    a direction from the oscillating mirror toward the first optical component and a direction from the oscillating mirror toward the second optical component do not overlap when viewed in the predetermined direction,
    the laser rangefinder comprises a plurality of pairs of the first optical component and the second optical component, and
    a first pair and a second pair among the plurality of pairs are symmetrically disposed about a normal to a reflective surface of the oscillating mirror, in the predetermined direction.

8. The laser rangefinder according to claim 1, wherein the second optical component is a condensing lens that condenses the second reflected light by transmitting the second reflected light.

9. The laser rangefinder according to claim 1, wherein the second optical component is a reflective mirror that condenses the second reflected light by reflecting the second reflected light.

10. The laser rangefinder according to claim 1, wherein the second optical component refracts, with positive refractive power, in the predetermined direction, the second reflected light to produce collimated light, and
    the laser rangefinder further comprises a third optical component that condenses the collimated light produced by the second optical component onto the photodetector.

11. The laser rangefinder according to claim 1, wherein the first optical component is a toroidal lens having a condensing function only in the predetermined direction among the predetermined direction and a direction perpendicular to the predetermined direction.

12. The laser rangefinder according to claim 1, further comprising
    an additional optical component that is disposed on an optical path of the laser light scanned by the oscillating mirror and has a thickness that increases with proximity to an end of a scanning area of the laser light scanned by the oscillating mirror, the thickness being measured along an optical path in a plane perpendicular to the predetermined direction,
    wherein the first optical component condenses, in a direction parallel to the predetermined direction, the laser light scanned through the additional optical component and subsequently reflected by the target object, and has a thickness that varies in accordance with the additional optical component, the thickness being measured along an optical path in a plane perpendicular to the predetermined direction, and
    the first optical component is integrally formed with the additional optical component.

13. The laser rangefinder according to claim 12, wherein a normal to a surface of the additional optical component on which the laser light is incident is oblique to an optical path of the incident laser light.

14. The laser rangefinder according to claim 12, wherein in a plane including the axis of oscillation, a surface of the first optical component from which the laser light reflected from the target object exits is a concave surface.

15. The laser rangefinder according to claim 14, wherein in a plane including the axis of oscillation, the concave surface has a curvature that increases with proximity to an end of the scanning area of the laser light scanned by the oscillating mirror.

16. The laser rangefinder according to claim 12, wherein the first optical component and the additional optical component are disposed on an opposite side, in the predetermined direction, of an optical path of the laser light between the light source and the oscillating mirror, relative to the second optical component.

17. The laser rangefinder according to claim 16, wherein the first optical component, the second optical component, and the additional optical component are disposed in different positions in the predetermined direction, and
    the laser light reaches the oscillating mirror from the light source after passing through a void formed between (i) the first optical component and the additional optical component and (ii) the second optical component.

* * * * *